US012750828B2

(12) United States Patent
Zhang et al.

(10) Patent No.: US 12,750,828 B2
(45) Date of Patent: Sep. 29, 2026

(54) METHOD FOR WIRELESS COMMUNICATION AND TERMINAL DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 240 days.

(21) Appl. No.: 18/740,138

(22) Filed: Jun. 11, 2024

(65) Prior Publication Data

US 2024/0334408 A1 Oct. 3, 2024

Related U.S. Application Data

(63) Continuation of application No. PCT/CN2021/137488, filed on Dec. 13, 2021.

(51) Int. Cl.
*H04W 72/0446* (2023.01)
*H04L 1/1812* (2023.01)
(Continued)

(52) U.S. Cl.
CPC ....... *H04W 72/0446* (2013.01); *H04L 1/1812* (2013.01); *H04W 28/26* (2013.01); *H04W 72/25* (2023.01); *H04W 72/40* (2023.01)

(58) Field of Classification Search
CPC . H04W 72/0446; H04W 72/25; H04W 72/40; H04W 72/04; H04W 72/20;
(Continued)

(56) References Cited

U.S. PATENT DOCUMENTS

| | | | | |
|---|---|---|---|---|
| 2021/0250924 | A1 | 8/2021 | Ji | |
| 2023/0362739 | A1* | 11/2023 | Zhao | H04W 72/25 |
| 2024/0057121 | A1* | 2/2024 | Ganesan | H04W 72/02 |

FOREIGN PATENT DOCUMENTS

| | | |
|---|---|---|
| CN | 112840586 | 5/2021 |
| CN | 113727355 | 11/2021 |

OTHER PUBLICATIONS

Robert Bosch GMBH, "Sidelink Resource Allocation Enhancements," 3GPP TSG RAN WG1 #102-e, R1-2006876, Aug. 2020.

(Continued)

*Primary Examiner* — Brian T Le
(74) *Attorney, Agent, or Firm* — Hodgson Russ LLP

(57) ABSTRACT

A method for wireless communication and a terminal device is provided. The method for wireless communication includes the following. The first terminal device determines the presence of the resource conflict on the resources reserved by the second terminal device on the first time unit. The first terminal device determines whether to send the resource conflict indication to the second terminal device on the target time unit. The resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, and the at least one time unit is used for transmission of sidelink (SL) feedback information.

20 Claims, 8 Drawing Sheets

(51) Int. Cl.
*H04W 28/26* (2009.01)
*H04W 72/25* (2023.01)
*H04W 72/40* (2023.01)

(58) Field of Classification Search
CPC ..... H04W 72/02; H04W 72/12; H04W 28/26; H04W 76/14; H04L 1/1812; H04L 1/18
See application file for complete search history.

(56) References Cited

OTHER PUBLICATIONS

Oppo, "Discussions on resource reservation, sensing and selection in Mode 2," 3GPP TSG-RAN WG1 Meeting #99, R1-1912794, Nov. 2019.
Cewit, "Feasibility and benefits for NR Sidelink mode 2 enhancements," 3GPP TSG RAN WG1 106-bis-e, R1-2109341, Oct. 2021.
WIPO, International Search Report and Written Opinion for International Application No. PCT/CN2021/137488, Aug. 25, 2022.

* cited by examiner

METHOD FOR WIRELESS COMMUNICATION AND TERMINAL DEVICE

CROSS-REFERENCE TO RELATED APPLICATION(S)

This application is a continuation of International Application No. PCT/CN2021/137488, filed Dec. 13, 2021, the entire disclosure of which is incorporated herein by reference.

TECHNICAL FIELD

Embodiments of the disclosure relate to the field of communication, and in particular to a method for wireless communication and a terminal device.

BACKGROUND

In sidelink (SL) communication, when a terminal (UE-A) detects a possible collision on resources reserved by another terminal (UE-B), UE-A sends a resource conflict indication to UE-B via a physical SL feedback channel (PSFCH), such that UE-B can perform corresponding retransmission or resource reselection. However, how UE-A sends the resource conflict indication is a problem to be solved.

SUMMARY

In a first aspect, a method for wireless communication is provided. The method includes the following. A first terminal device determines presence of a resource conflict on resources reserved by a second terminal device on a first time unit. The first terminal device determines whether to send a resource conflict indication to the second terminal device on a target time unit. The resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of a SL carrier.

In a second aspect, a method for wireless communication is provided. The method includes the following. A second terminal device receives a resource conflict indication sent by a first terminal device on a target time unit. The resource conflict indication indicates presence of a resource conflict on resources reserved by the second terminal device on a first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of an SL carrier.

In a third aspect, a terminal device is provided. The terminal device includes a processor and a memory. The memory is configured to store computer programs. The processor is configured to invoke and execute the computer programs stored in the memory, to perform the following. Presence of a resource conflict on resources reserved by a second terminal device on a first time unit is determined. Whether to send a resource conflict indication to the second terminal device on a target time unit is determined. The resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of a SL carrier

DETAILED DESCRIPTION

Figure 1:
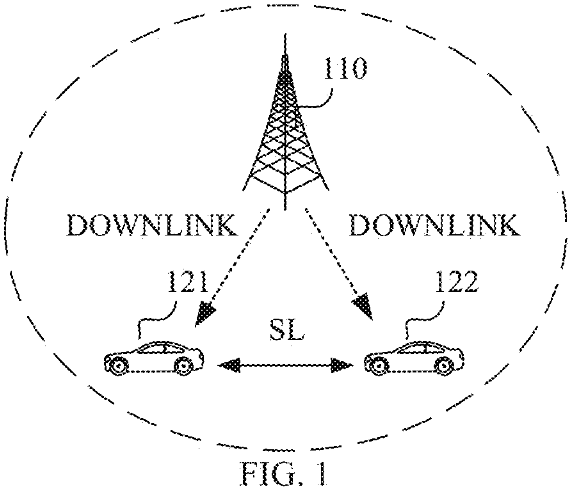
FIG. 1 is a schematic architectural diagram of a communication system provided in the disclosure.

The following will describe technical solutions of embodiments of the disclosure with reference to accompanying drawings in embodiments of the disclosure. Apparently, embodiments described herein are merely some embodiments, rather than all embodiments, of the disclosure. Based on embodiments of the disclosure, all other embodiments obtained by those of ordinary skill in the art without creative effort shall fall within the protection scope of the disclosure.

The technical solutions of embodiments of the disclosure are applicable to various communication systems, for example, a global system of mobile communication (GSM), a code division multiple access (CDMA) system, a wide-band code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), an internet of things (IoT), a wireless fidelity (WiFi), a 5th-generation (5G) communication system, or other communication systems, etc.

Generally speaking, a conventional communication system generally supports a limited quantity of connections and therefore is easy to implement. However, with development of communication technology, a mobile communication system will not only support conventional communication but also support, for example, device-to-device (D2D) communication, machine-to-machine (M2M) communication, machine type communication (MTC), vehicle-to-vehicle (V2V) communication, or vehicle to everything (V2X) communication, etc. Embodiments of the disclosure can also be applied to these communication systems.

Optionally, the communication system in embodiments of the disclosure may be applied to a carrier aggregation (CA) scenario, or may be applied to a dual connectivity (DC) scenario, or may be applied to a standalone (SA) network deployment scenario.

Optionally, the communication system in embodiments of the disclosure is applicable to an unlicensed spectrum, and an unlicensed spectrum may be regarded as a shared spectrum. Alternatively, the communication system in embodiments of the disclosure is applicable to a licensed spectrum, and a licensed spectrum may be regarded as a non-shared spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In embodiments of the disclosure, the terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.).

In embodiments of the disclosure, the terminal device may be a mobile phone, a pad, a computer with wireless transceiver functions, a virtual reality (VR) terminal device, an augmented reality (AR) terminal device, a wireless terminal device in industrial control, a wireless terminal device in self-driving, a wireless terminal device in remote medicine, a wireless terminal device in smart grid, a wireless terminal device in transportation safety, a wireless terminal device in smart city or a wireless terminal device in smart home, an in-vehicle communication device, an application specific integrated circuit (ASIC), a system on chip (SoC), etc.

By way of explanation rather than limitation, in embodiments of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelry for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in a WLAN, a base transceiver station (BTS) in GSM or CDMA, or may be a Node B (NB) in WCDMA, or may be an evolutional Node B (eNB or eNodeB) in LTE, or a relay station or AP, or an in-vehicle device, a wearable device, a network device or a station (gNB) in an NR network, a network device in a future evolved PLMN, a network device in an NTN, etc.

By way of explanation rather than limitation, in embodiments of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In embodiments of the disclosure, the network device serves a cell, and the terminal device communicates with the network device on a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are adapted to provide data transmission service at a high rate.

It may be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone.

In addition, the character "/" herein generally indicates that the associated objects are in an "or" relationship.

Terms used in the implementations of the disclosure are merely intended to explain embodiments of the disclosure rather than limiting the disclosure. The terms "first", "second", "third", "fourth", and the like used in the specification, the claims, and the accompanying drawings of the disclosure are used to distinguish different objects rather than describe a particular order. In addition, the terms "include", "comprise", and "have" as well as variations thereof are intended to cover a non-exclusive inclusion.

It may be understood that, "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates (', and B can be obtained according to ('; or may mean that there is an association relationship between A and B.

In the elaboration of embodiments of the disclosure, the term "correspondence" may mean that there is a direct or indirect correspondence between the two, may mean that there is an association between the two, may mean a relationship of indicating and indicated or configuring and configured, etc.

In embodiments of the disclosure, the "pre-defined" or "pre-configured" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

In order to better understand the technical solutions of embodiments of the disclosure, the technical solutions of the disclosure will be described in detail below in connection with embodiments. The following related art as an optional scheme can be arbitrarily combined with the technical solutions of embodiments of the disclosure, which shall all belong to the protection scope of embodiments of the disclosure. Embodiments of the disclosure include at least some of the following.

FIG. 1 is a schematic diagram of a communication system to which embodiments of the disclosure are applicable. A transmission resource(s) for an in-vehicle terminal (in-vehicle terminal 121 and in-vehicle terminal 122) is allocated by a base station 110, and the in-vehicle terminal performs data transmission on a sidelink (SL) on the resource(s) allocated by the base station 110. Specifically, the base station 110 may allocate to the terminal a resource(s) for single transmission, or may also allocate to the terminal a resource(s) for semi-persistent transmission.

Figure 2:
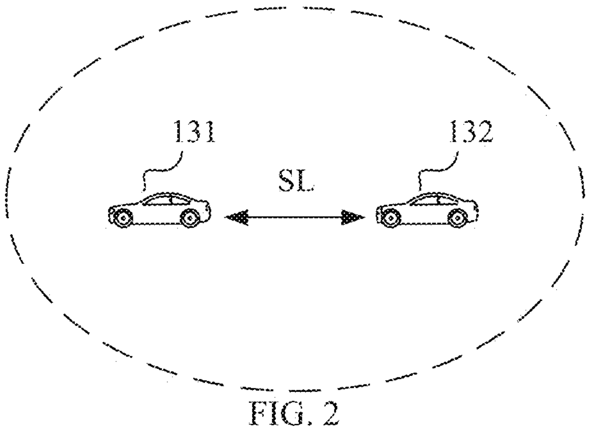
FIG. 2 is a schematic architectural diagram of another communication system provided in the disclosure.

FIG. 2 is a schematic diagram of another communication system to which embodiments of the disclosure are applicable. An in-vehicle terminal (in-vehicle terminal 131 and in-vehicle terminal 132) autonomously selects a transmission resource(s) for data transmission from SL resources. Optionally, the in-vehicle terminal may select a transmission resource(s) randomly, or may select a transmission resource (s) by sensing.

Figure 3:
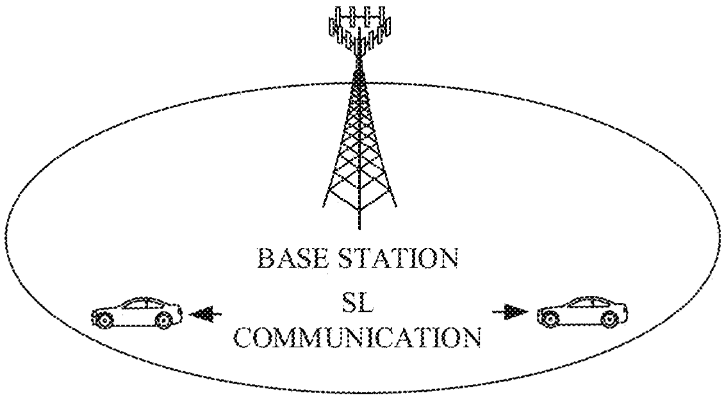
FIG. 3 is a schematic diagram illustrating in-coverage sidelink (SL) communication provided in the disclosure.
Figure 4:
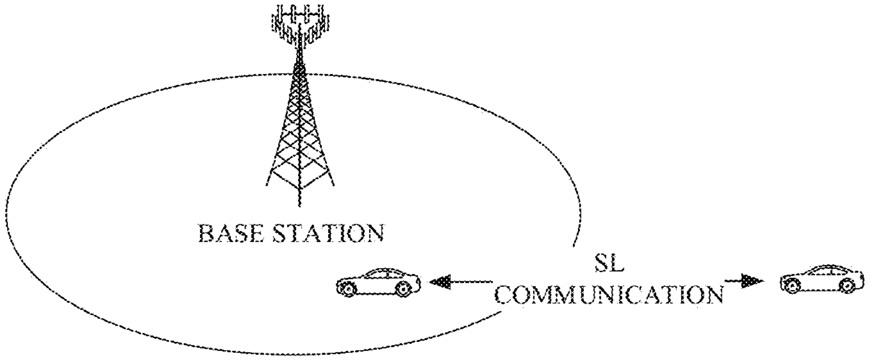
FIG. 4 is a schematic diagram illustrating partial-coverage SL communication provided in the disclosure.
Figure 5:
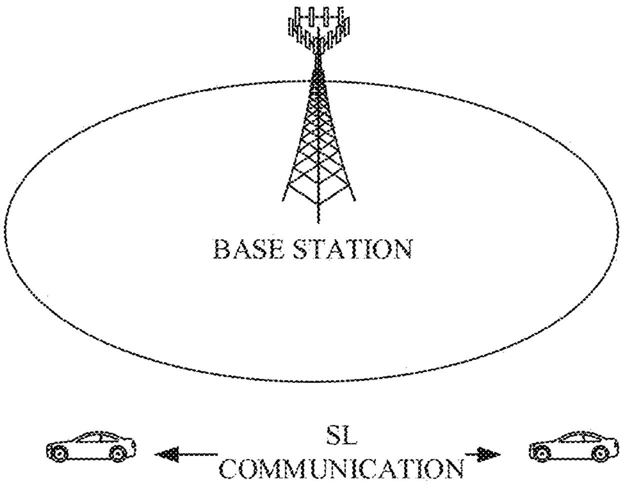
FIG. 5 is a schematic diagram illustrating out-of-coverage SL communication provided in the disclosure.

It may be noted that, according to a network coverage condition of terminals in communication, SL communication may be classified into in-coverage SL communication as illustrated in FIG. 3, partial-coverage SL communication as illustrated in FIG. 4, and out-of-coverage SL communication as illustrated in FIG. 5.

As illustrated in FIG. 3, in in-coverage SL communication, all terminals in SL communication are located within a coverage of a base station, so that all the terminals can receive configuration signaling from the base station and perform SL communication based on the same SL configuration.

As illustrated in FIG. 4, in partial-coverage SL communication, some of terminals in SL communication are located within a coverage of a base station, and these terminals can receive configuration signaling from the base station and perform SL communication based on a configuration from the base station. However, a terminal(s) located out of a coverage of a network cannot receive the configuration signaling from the base station. In this case, the terminal(s) out of the coverage of the network may determine an SL configuration according to pre-configuration information as well as information carried in a physical SL broadcast channel (PSBCH) sent by the terminal(s) located within the coverage of the network, and then perform SL communication.

As illustrated in FIG. 5, in out-of-coverage SL communication, all terminals in SL communication are located out of a coverage of a network, and all the terminals may determine an SL configuration according to pre-configuration information and then perform SL communication.

Figure 6:
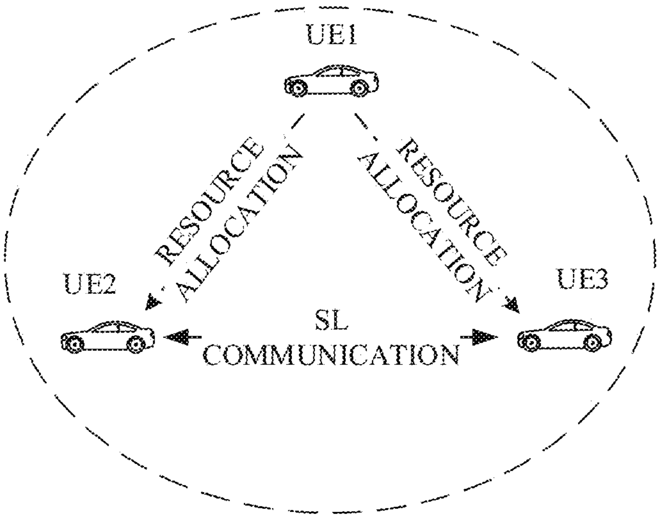
FIG. 6 is a schematic diagram illustrating SL communication with a central control node provided in the disclosure.

As illustrated in FIG. 6, in SL communication with a central control node, multiple terminals constitute a communication group, and the communication group includes a central control node, which may also be referred to as a cluster header (CH). The central control node has one of the following functions: being responsible for establishment of a communication group; adding a member(s) to the group and removing a member(s) from the group; performing resource coordination, such as allocating SL transmission resources to other terminals, and receiving SL feedback information from other terminals; communicating with other communication groups for resource coordination, or the like.

It may be noted that, D2D communication is a D2D-based SL transmission technology. Different from a traditional cellular system in which communication data is received or sent by a base station, a V2X system adopts D2D direct communication, thereby having higher spectral efficiency and lower transmission delay. In the 3rd generation partnership project (3GPP), two transmission modes are defined, which are referred to as mode 1 (i.e., SL resource allocation mode 1) and mode 2 (i.e., SL resource allocation mode 2) respectively.

Mode 1: a transmission resource(s) for a terminal is allocated by a base station, and the terminal performs data transmission on an SL on the resource(s) allocated by the base station. The base station may allocate to the terminal a resource(s) for single transmission, or may allocate to the terminal a resource(s) for semi-persistent transmission. As illustrated in FIG. 3, the terminal is located within the coverage of the network, and the network allocates to the terminal a transmission resource(s) for SL transmission.

Mode 2: the terminal selects a resource(s) for data transmission from a resource pool. As illustrated in FIG. 5, the terminal is located out of a coverage of a cell, and the terminal autonomously selects a transmission resource(s) for SL transmission from a pre-configured resource pool. Alternatively, as illustrated in FIG. 3, the terminal autonomously selects a transmission resource(s) for SL transmission from a resource pool configured by the network.

In NR-V2X, automatic driving is supported. Therefore, NR-V2X has higher requirements for data interaction between vehicles, such as higher throughput, lower delay, higher reliability, larger coverage, more flexible resource allocation, and the like.

Figure 7:
FIG. 7 is a schematic diagram illustrating unicast SL communication provided in the disclosure.
Figure 8:
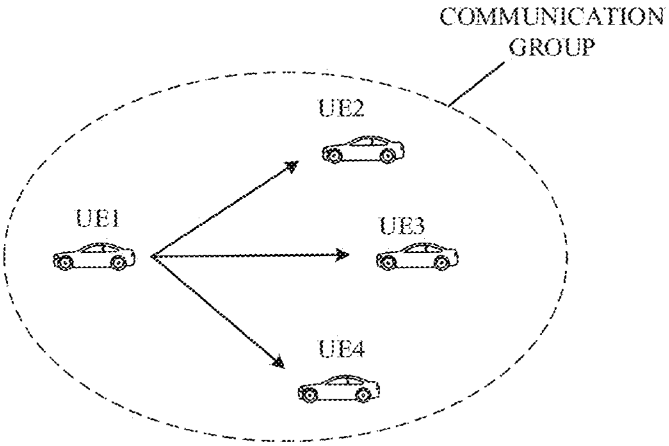
FIG. 8 is a schematic diagram illustrating groupcast SL communication provided in the disclosure.
Figure 9:
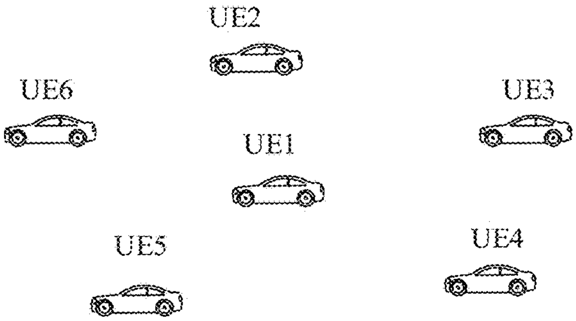
FIG. 9 is a schematic diagram illustrating broadcast SL communication provided in the disclosure.

In LTE-V2X, a broadcast transmission mode is supported. In NR-V2X, a unicast transmission mode and a groupcast transmission mode are introduced. In unicast transmission, only one terminal may serve as a receiving terminal. As illustrated in FIG. 7, unicast transmission is performed between UE 1 and UE 2. In groupcast transmission, all terminals in a communication group or all terminals within a certain transmission distance may serve as receiving terminals. As illustrated in FIG. 8, UE 1, UE 2, UE 3, and UE 4 constitute a communication group, where UE 1 sends data, and other terminal devices in the group all serve as receiving terminals. In the broadcast transmission mode, any one of terminals around a sending terminal may serve as a receiving terminal. As illustrated in FIG. 9, UE 1 serves as a sending terminal, and other terminals, i.e., UE 2 to UE 6, around UE 1 all serve as receiving terminals.

In an SL transmission system, a resource pool is introduced. The resource pool is a set of transmission resources. No matter whether a transmission resource is a transmission resource configured by the network or a transmission resource autonomously selected by the terminal, the transmission resource is a resource in the resource pool. The resource pool may be pre-configured or may be configured by the network, and one or more resource pools may be configured. The resource pool is classified into a transmission resource pool and a receiving resource pool. Transmission resources in the transmission resource pool are used for SL data transmission. Transmission resources in the receiving resource pool are used by the terminal to receive SL data.

For a better understanding of embodiments of the disclosure, SL control information (SCI) involved in the disclosure will be described.

Figure 10:
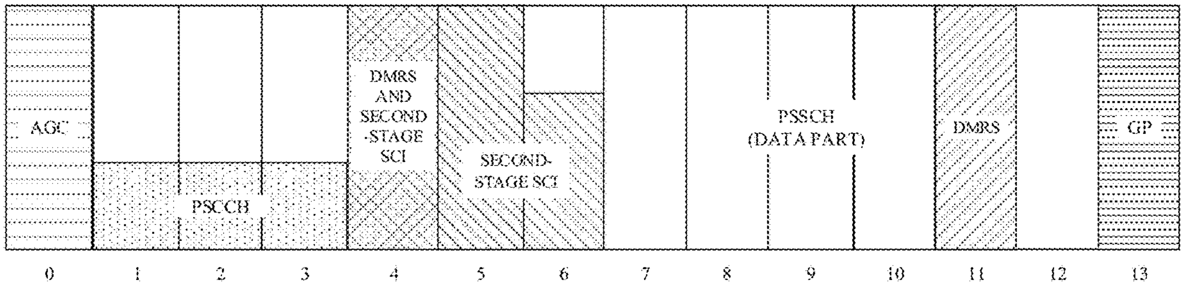
FIG. 10 is a schematic diagram illustrating frame structures of a physical SL control channel (PSCCH) and a physical SL shared channel (PSSCH) provided in the disclosure.

Two-stage SCI is introduced in NR-V2X. A first stage SCI is carried in a physical SL control channel (PSCCH) and indicates information such as a transmission resource(s) for a physical SL shared channel (PSSCH), information of reserved resources, an order of modulation and coding scheme (MCS), and priority information. A second stage SCI is sent on the resource(s) for the PSSCH, is demodulated with a demodulation reference signal (DMRS) for the PSSCH, and indicates information for data demodulation, such as an identity (ID) of a sending end (also referred to as a source ID), an ID of a receiving end (also referred to as a destination ID), a hybrid automatic repeat reQuest (HARQ) ID, a new data indicator (NDI). The first symbol is often used for auto gain control (AGC). The PSCCH occupies symbols in a slot starting from the second symbol. The last symbol often serves as a guard period (GP). The second stage SCI is first mapped to a symbol where a first DMRS symbol of the PSSCH is located in an order of first frequency domain and then time domain. As illustrated in FIG. 10, the PSCCH occupies three symbols (symbol 1, symbol 2, and symbol 3), the DMRS for the PSSCH occupies symbol 4 and symbol 11, the second stage SCI is mapped starting from symbol 4, the second stage SCI and the DMRS are multiplexed in frequency-division multiplexing in symbol 4, and the second stage SCI is mapped to symbol 4, symbol 5, and symbol 6. A size of resources occupied by the second stage SCI depends on the number (quantity) of bits of the second stage SCI.

For a better understanding of embodiments of the disclosure, a physical SL feedback channel (PSFCH) involved in the disclosure will be described.

In NR-V2X, a PSFCH supporting a sequence type is referred to as a PSFCH format 0. This type of PSFCH occupies a physical resource block (PRB) in a frequency domain and an orthogonal frequency-division multiplexing (OFDM) symbol in a time domain, and a sequence type adopted is the same as a physical uplink control channel (PUCCH) format 0. In a resource pool, a PSFCH resource(s) is configured with a period of 1, 2, or 4 slots and is stored on the slots of the PSFCH resource(s), and the PSFCH resource(s) is located on the last OFDM symbol which can be used for SL transmission in the slots. However, in order to support transmitting/receiving conversion and an AGC adjustment, a PSFCH symbol is preceded by two OFDM symbols for the transmitting/receiving conversion and the AGC adjustment, respectively. In addition, the PSCCH and the PSSCH are not allowed to be sent on the three OFDM symbols. For example, the PSFCH is only used for carrying hybrid automatic repeat reQuest acknowledgement (HARQ-ACK) feedback information, and one PSFCH has a capacity of one bit.

A transmission resource(s) for the PSFCH is determined according to a time-frequency position of a transmission resource(s) for a PSSCH corresponding to the PSFCH. In NR-V2X, two manners for determining the PSFCH resource (s) are supported as follows. The specific manner for determining the PSFCH resource(s) is configured according to higher-layer signaling.

Manner 1: the transmission resource(s) for the PSFCH is determined according to a first sub-channel occupied by a frequency domain resource(s) for the PSSCH.

Manner 2: the transmission resource(s) for the PSFCH is determined according to all sub-channels occupied by a frequency domain for the PSSCH.

For the manner for determining the resource(s) in Manner 1, since the transmission resource(s) for the PSFCH is determined only according to the first sub-channel occupied by the PSSCH, no matter how many sub-channels the PSSCH occupies, the number of feedback resources for a PSFCH corresponding to the PSSCH is fixed. For Manner 2, the number of the transmission resource(s) for the PSFCH is determined according to the number of the sub-channels occupied by the PSSCH, such that more sub-channels occupied by the PSSCH causes more transmission resource(s) for the PSFCH corresponding to the PSSCH. Therefore, Manner 2 is more suitable for a scenario where a large amount of SL HARQ feedback resources is required, such as a second type of manners for SL HARQ feedback in groupcast.

A transmission resource set for the PSFCH $$R_{PRB,CS}^{PSFCH}$$

can be determined according to a slot and a sub-channel in which the PSSCH corresponding to the PSFCH is sent. An index of the transmission resource(s) for the PSFCH in the resource set is determined according to resource blocks (RBs) in ascending order and then cyclic shift (CS) pairs in ascending order. Further, in the resource set, the transmission resource(s) for the PSFCH is determined according to the following Formula 1:

$$(P_{ID}+M_{ID}) \bmod R_{PRB,CS}^{PSFCH} \quad \text{Formula 1}$$

where $P_{ID}$ indicates identity (ID) information of the sending terminal, i.e., a source ID of the sending terminal UE carried in the SCI. For a manner for SL HARQ feedback with unicast or groupcast in which only negative acknowledgment is fed back (NACK-only), $M_{ID}=0$; and for a manner for SL HARQ feedback with acknowledgment (ACK)/negative acknowledgment (NACK), $M_{ID}$ indicates an intra-group ID of the receiving terminal UE configured by a higher layer.

In NR-V2X, the PSFCH resource(s) is configured by SL-PSFCH-Config-r16 signaling, where a PSFCH period (sl-PSFCH-Period-r16) is used for configuring a period of the PSFCH resource(s); a PSFCH RB set (sl-PSFCH-RB-Set-r16) is used for configuring a PRB used for transmission of the PSFCH on an OFDM symbol where the PSFCH resource(s) is located; the number of cyclic shift pairs (sl-NumMuxCS-Pair-r16 is used for configuring the number of cyclic shift pairs of a PSFCH sequence allowed in one PRB; a minimum time gap of the PSFCH (sl-MinTimeGapPSFCH-r16) is used for configuring a minimum time gap between the PSFCH and the PSSCH associated with the PSFCH; a hopping ID of the PSFCH (sl-PSFCH-HopID-r16) is used for configuring a hopping ID of the PSFCH, and the hopping ID of the PSFCH is used for determining the PSFCH sequence; and sl-PSFCH-Candidate Resource Type-r16 is used for configuring a manner for determining a candidate resource(s) for the PSFCH.

For a better understanding of embodiments of the disclosure, enhanced resource allocation in NR-V2X involved in the disclosure will be described.

In mode 2 described above, a terminal device selects a transmission resource(s) randomly from a resource pool or selects a transmission resource(s) according to a sensing result. In such a resource selection mode, interference between terminals can be avoided to some extent, but such a resource selection mode has the following problems.

Figure 11:
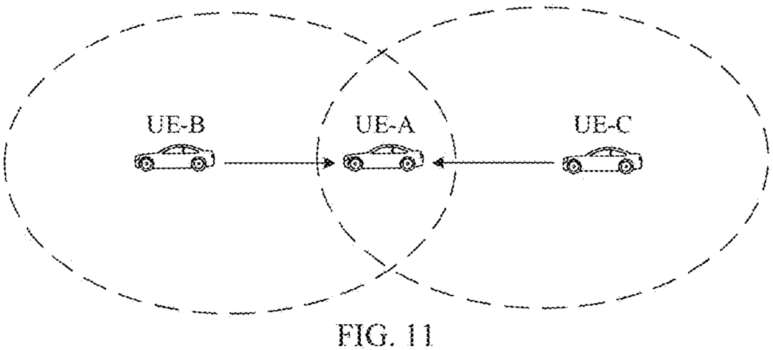
FIG. 11 is a schematic diagram illustrating a hidden node provided in the disclosure.

1. Hidden node: as illustrated in FIG. 11, UE-B selects a resource(s) by sensing, and sends SL data to UE-A on the resource(s). UE-B and UE-C are far from each other, UE-B cannot sense transmission of UE-C, and UE-C cannot sense transmission of UE-B, so that UE-B and UE-C may select the same transmission resource. In this case, data transmission by UE-C may interfere with data transmission by UE-B. This is a problem generated due to hidden nodes.

2. Problem generated due to half duplex: due to limitation of half duplex, when the terminal sends SL data in a slot in a sensing window, the terminal cannot receive in the slot data sent by other terminals, so that when the terminal performs sensing to select a transmission resource, there is no sensing result. Therefore, when performing resource exclusion, the terminal may exclude from a selection window all resources corresponding to the slot in the sensing window to avoid interference with other terminals. Due to limitation of half duplex, many resources are unnecessarily excluded by the terminal.

Figure 12:
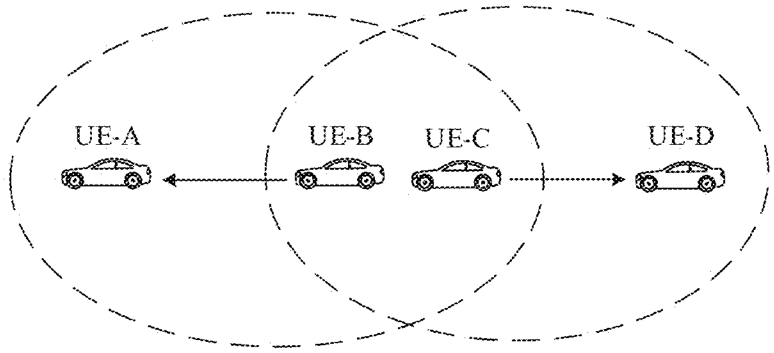
FIG. 12 is a schematic diagram illustrating an exposed terminal provided in the disclosure.

3. Problem generated due to exposed terminal: as illustrated in FIG. 12 below, sending UE-B and sending UE-C can sense each other, but target receiving UE-A of sending UE-B is far from sending UE-C, and target receiving UE-D of sending UE-C is far from sending UE-B. In this case, even though sending UE-B and sending UE-C use the same time-frequency resource, reception by the target receiving terminal of sending UE-B and reception by the target receiving terminal of sending UE-C may not be affected. However, since sending UE-B and sending UE-C are close to each other in geographic location, sending UE-B and sending UE-C may both detect relatively high signal received power during sensing. As a result, a time-frequency resource selected by sending UE-B and a time-frequency resource selected by sending UE-C may be orthogonal, which may degrade resource utilization efficiency.

4. Power-consumption problem: in the above sensing procedure, the terminal needs to perform resource sensing contiguously to determine which resources are available, which may cause high power consumption. This does not matter for an in-vehicle terminal because the in-vehicle terminal is equipped with a power supply device. However, for a handheld terminal, excessive power consumption will result in power-off of the terminal soon. Therefore, how to reduce power consumption of the terminal is also a problem that needs to be taken into consideration during resource selection.

Due to the above problems that occur during resource selection in mode 2, an enhanced resource-selection scheme is proposed.

In some embodiments, based on the resource sensing used in mode 2, a terminal device (UE-A) may send a reference resource set to another terminal device (UE-B) to assist UE-B in resource selection. The reference resource set may be an available resource set that may be obtained by UE-A according to a resource sensing result, an indication of a base station, and the like, or may be determined by UE-A according to a detected SCI. The reference resource set may be a resource set suitable for use by UE-B. In this case, when UE-B is to select a resource(s) for sending SL data to a target receiving terminal, UE-B may preferentially select a resource(s) from the available resource set, thereby improving reliability in reception of the SL data by the target receiving terminal. Alternatively, the resource set may also be a resource set unsuitable for use by UE-B. In this case, during resource selection, UE-B can avoid selecting a resource(s) from the resource set, thereby avoiding occurrence of problems generated due to hidden terminals, the limitation of the half duplex, or the like. A terminal functioning as UE-A is referred to as a resource coordination terminal.

Figure 13:
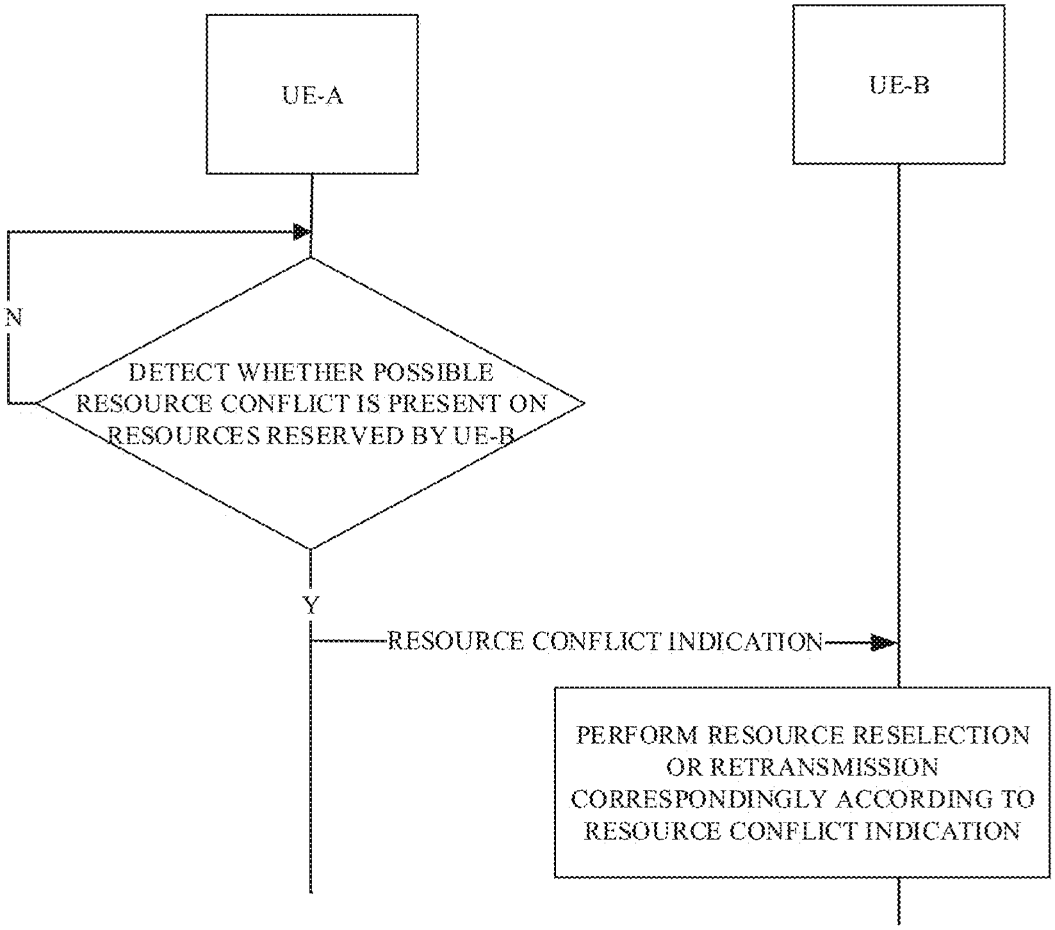
FIG. 13 is a schematic diagram illustrating transmission of a resource conflict indication by UE-A provided in the disclosure.

In some embodiments, as illustrated in FIG. 13, if UE-A has detected a possible collision on the resources reserved by UE-B, UE-A sends a resource collision indication to UE-B via the PSFCH, such that UE-B can perform retransmission or resource reselection correspondingly.

Compared with mode 2 in which the terminal autonomously selects a transmission resource(s), the enhanced resource-allocation mode described above, in which the terminal performs resource selection based on assistance information sent by other terminals, can improve reliability of transmission.

However, in the enhanced scheme described above (as illustrated in FIG. 13) in which UE-A sends the resource conflict indication to UE-B, it is not clear how UE-A sends the resource conflict indication and how UE-B performs resource reselection according to the resource conflict indication.

Based on the above problems, a solution to the resource conflict is provided in embodiments of the disclosure. In the case that a first terminal device determines presence of a resource conflict on resources reserved by a second terminal device on a first time unit, the first terminal device can determine whether to send a resource conflict indication to the second terminal device on a target time unit, and the second terminal device can know a possible resource collision on resources to be used and perform resource reselection correspondingly, thereby improving reliability of SL data transmission.

Technical solutions of the disclosure will be described in detail below in connection with embodiments.

Figure 14:
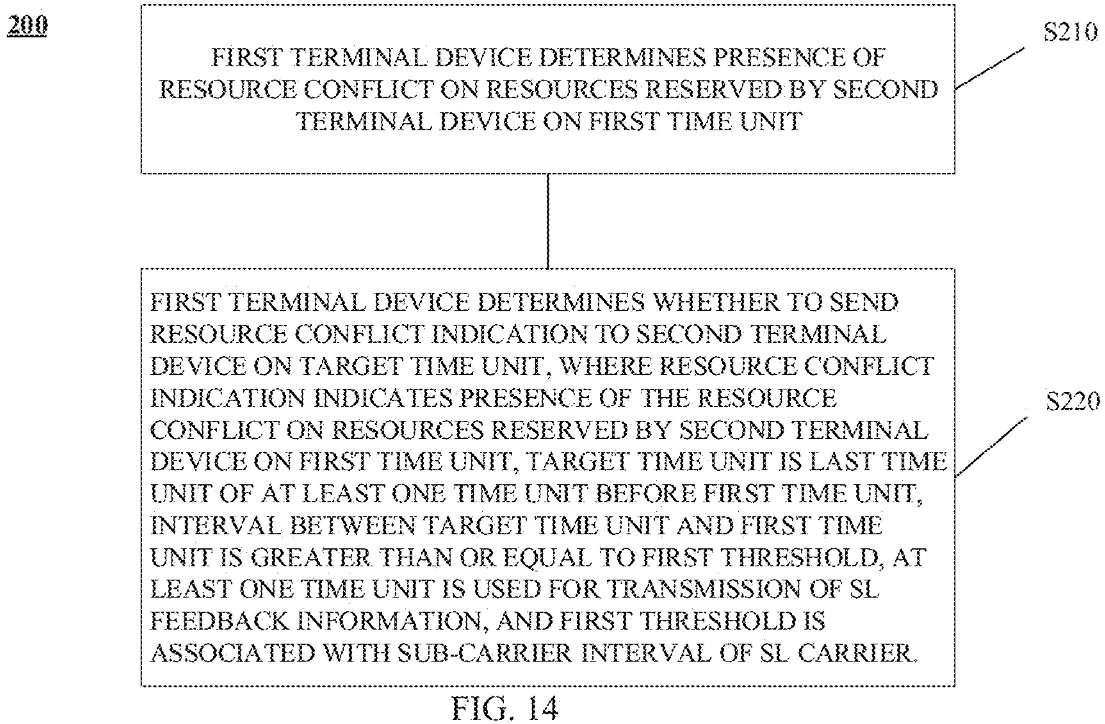
FIG. 14 is a schematic flow chart of a method for wireless communication provided in embodiments of the disclosure.

FIG. 14 is a schematic flow chart of a method 200 for wireless communication according to embodiments of the disclosure. As illustrated in FIG. 14, the method 200 for wireless communication may include at least part of the following.

At S210, a first terminal device determines presence of a resource conflict on resources reserved by a second terminal device on a first time unit.

At S220, the first terminal device determines whether to send a resource conflict indication to the second terminal device on a target time unit.

The resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of a SL carrier.

In embodiments of the disclosure, the first terminal device may determine the presence of the resource conflict on the resources reserved by the second terminal device on the first time unit based on a resource sensing result, or the first terminal device may determine the presence of the resource conflict on the resources reserved by the second terminal device on the first time unit based on an indication of a network device, or the first terminal device may determine the presence of the resource conflict on the resources reserved by the second terminal device on the first time unit based on a detected SCI. In addition, the first terminal device may also determine the presence of the resource conflict on the resources reserved by the second terminal device on the first time unit in other manners, which is not limited in the disclosure.

In some embodiments, a time unit is one of a slot or a symbol. In other words, the first time unit may be a slot or a symbol, and the target time unit may be a slot or a symbol. In addition, the time unit may also be a subframe, a frame, milliseconds (ms), etc., which is not limited in the disclosure.

In some embodiments, the first threshold may indicate a time required for the terminal device to decode an SCI and prepare for next corresponding transmission according to a decoded result. Specifically, for example, when the time unit is a slot, the first threshold can be represented by T3, and an association relationship between T3 and the sub-carrier interval of the SL carrier can be specifically illustrated in Table 1, where $\mu_{SL}$ indicates an index of the sub-carrier interval of the SL carrier. $\mu_{SL}$=0 corresponds to subcarrier interval=15 kHz, $\mu_{SL}$=1 corresponds to subcarrier interval=30 kHz, $\mu_{SL}$=2 corresponds to subcarrier interval=60 kHz, and $\mu_{SL}$=3 corresponds to subcarrier interval=120 kHz.

TABLE 1

| $\mu_{SL}$ | T3 [slots] |
|---|---|
| 0 | 3 |
| 1 | 5 |
| 2 | 9 |
| 3 | 17 |

In some embodiments, the resource conflict indication may be sent through a PSFCH resource(s). In other words, at least the PSFCH resource(s) is present in the target time unit.

In some embodiments, the first terminal device is identified as UE-A, the second terminal device is identified as UE-B, the first time unit is identified as slot m, and the target time unit is identified as slot F. Specifically, for example, if UE-A has detected a possible collision or conflict on resources on slot m reserved by an SCI sent by UE-B on slot n, UE-A may send the resource conflict indication to UE-B through a PSFCH corresponding to a conflicting resource(s) on slot F, where slot F is an index of a last slot on which a PSFCH resource(s) for the resource conflict indication is present before slot m and an interval between slot F and slot m is not less than T3.

In some embodiments, the first terminal device is a target receiving terminal for the second terminal device, the second terminal device has sent a first transmission block (TB) to the first terminal device on a second time unit, the reserved resources are used for retransmission of the first TB, and the second time unit is before the target time unit. The second time unit may be a slot or a symbol. Specifically, operations at S220 may include that the first terminal device determines, according to first information, whether to send the resource conflict indication to the second terminal device on the target time unit.

Specifically, for example, the first information includes but is not limited to at least one of: whether the first terminal device successfully decodes the first TB, whether SL feedback for a TB sent on the second time unit has been activated, a format of a second stage SCI sent by the second terminal device on the second time unit, whether the first terminal device sends HARQ-ACK feedback information for the first TB on the target time unit, or whether the first terminal device is able to simultaneously send the resource conflict indication and the HARQ-ACK feedback information for the first TB on the target time unit.

Example 1 to Example 4 will elaborate that the first terminal device determines, according to the first information, whether to send the resource conflict indication to the second terminal device on the target time unit as follows.

Example 1, the first information includes: whether the first terminal device successfully decodes the first TB, whether the SL feedback for the TB sent on the second time unit has been activated, and whether the first terminal device sends the HARQ-ACK feedback information for the first TB on the target time unit.

Specifically, in Example 1, when the first terminal device does not send the HARQ-ACK feedback information for the first TB on the target time unit and the SL feedback for the TB sent on the second time unit has been activated, in the case that the first terminal device fails to decode the first TB, the first terminal device determines to send the resource conflict indication to the second terminal device on the target time unit; and/or in the case that the first terminal device successfully decodes the first TB, the first terminal device determines not to send the resource conflict indication to the second terminal device on the target time unit.

Specifically, for example, the first terminal device is identified as UE-A, the second terminal device is identified as UE-B, the first time unit is identified as slot m, the target time unit is identified as slot F, and the second time unit is identified as slot n. In Example 1, UE-A is the target receiving terminal for UE-B, that is, UE-A receives the TB sent by UE-B on slot n and/or slot m, and UE-A sends the HARQ-ACK feedback information for the TB sent by UE-B on slot n on a slot other than slot F. In the case that UE-A fails to decode the TB sent by UE-B on slot n and the resources reserved on slot m is used for retransmission of a same TB sent on slot n, UE-A sends the resource conflict indication to UE-B on slot F. Specifically, if a value of a HARQ feedback enabled/disabled indicator field in the second stage SCI sent by UE-B on slot n is 1 (i.e., HARQ-ACK feedback is to be activated), that is, the HARQ-ACK feedback for the TB sent on slot n is to be activated, and UE-A feeds back an NACK in a HARQ-ACK feedback slot corresponding to slot n, UE-A sends the resource conflict indication through the PSFCH corresponding to the conflicting resource(s) on slot F. On the contrary, that is, when UE-A successfully decodes the TB sent by UE-B on slot n, UE-A does not send the resource conflict indication on slot F.

In Example 1, when UE-A successfully decodes the TB sent by UE-B on slot n, UE-B will stop the retransmission, and UE-A does not need to send the resource conflict indication. In this case, signaling overhead can be reduced, and UE-B can be prevented from performing unnecessary resource reselection.

Example 2, the first information includes: whether the first terminal device successfully decodes the first TB, and whether the SL feedback for the TB sent on the second time unit has been activated. The first information may further include the format of the second stage SCI sent by the second terminal device on the second time unit.

Specifically, in Example 2, when the first terminal device does not send the HARQ-ACK feedback information for the first TB on the target time unit and the SL feedback for the TB sent on the second time unit has not been activated, the first terminal device determines to send the resource conflict indication to the second terminal device on the target time unit.

Specifically, for example, the first terminal device is identified as UE-A, the second terminal device is identified as UE-B, the first time unit is identified as slot m, the target time unit is identified as slot F, and the second time unit is identified as slot n. In Example 2, UE-A is the target receiving terminal for UE-B, that is, UE-A receives the TB sent by UE-B on slot n and/or slot m, and the HARQ-ACK feedback for the TB sent by UE-B on slot n has not been activated. In this case, UE-A sends the resource conflict indication to UE-B on slot F. Specifically, the format of the second stage SCI sent by UE-B on slot n is 2-A, and a value of a cast type indicator field in the second stage SCI is 00 (i.e., broadcast), or the value of the HARQ feedback enabled/disabled indicator field in the second stage SCI sent by UE-B on slot n is 0 (i.e., the HARQ-ACK feedback is to be disabled). In this case, UE-A sends the resource conflict indication through the PSFCH corresponding to the conflicting resource(s) on slot F.

In Example 2, when HARQ-ACK feedback has not been activated, UE-B will perform blind retransmission, and the resource conflict indication sent by UE-A can trigger resource reselection by UE-B, thereby avoiding a conflict between UE-B and another terminal.

Example 3, the first information includes: whether the first terminal device successfully decodes the first TB, whether the SL feedback for the TB sent on the second time unit has been activated, and whether the first terminal device sends the HARQ-ACK feedback information for the first TB on the target time unit. The first information may further include the format of the second stage SCI sent by the second terminal device on the second time unit.

Specifically, in Example 3, when the first terminal device sends the HARQ-ACK feedback information for the first TB on the target time unit and the SL feedback for the TB sent on the second time unit has been activated, where the SL feedback is the HARQ-ACK feedback and the SL feedback includes an ACK or an NACK, in the case that the first terminal device successfully decodes the first TB, the first terminal device determines not to send the resource conflict indication to the second terminal device on the target time unit, and the first terminal device sends an ACK indicating a transmission success of the first TB on the target time unit; and/or in the case that the first terminal device fails to decode the first TB, the first terminal device determines to send the resource conflict indication to the second terminal device on the target time unit, and the first terminal device skips sending an NACK indicating a transmission failure of the first TB on the target time unit.

Specifically, in Example 3, the format of the second stage SCI sent by the second terminal device on the second time unit is 2-A; the value of the cast type indicator field in the second stage SCI indicates that groupcast is performed when HARQ-ACK information includes the ACK or the NACK, or the value of the cast type indicator field in the second stage SCI indicates that unicast is performed; and the value of the HARQ feedback enabled/disabled indicator field in the second stage SCI indicates that the HARQ-ACK feedback is to be activated and the ACK or the NACK is to be fed back.

Specifically, for example, the first terminal device is identified as UE-A, the second terminal device is identified as UE-B, the first time unit is identified as slot m, the target time unit is identified as slot F, and the second time unit is identified as slot n. In Example 3, UE-A is the target receiving terminal for UE-B, that is, UE-A receives the TB sent by UE-B on slot n and/or slot m, UE-A sends, on slot F, the HARQ-ACK feedback for the TB sent by UE-B on slot n, and the resources reserved on slot m is used for the retransmission of the same TB sent on slot n. In this case, UE-A determines whether to send the conflict indication to UE-B on slot Fin Manner 1 and Manner 2 as follows.

Manner 1: the format of the second stage SCI sent by UE-B on slot n is 2-A; the value of the cast type indicator field in the second stage SCI is 01 (i.e., the groupcast is performed when the HARQ-ACK information includes the ACK or the NACK), or the value of the cast type indicator field in the second stage SCI is 10 (i.e., unicast); and the value of the HARQ feedback enabled/disabled indicator field in the second stage SCI is 1 (i.e., the HARQ-ACK feedback is to be activated and the ACK or the NACK is to be fed back). In the case that UE-A successfully decodes the TB sent by UE-B on slot n, UE-A feeds back the HARQ-ACK feedback (i.e., ACK) for the TB and does not send the resource conflict indication on slot F.

In Manner 1, the ACK feedback can terminate the retransmission by UE-B, thereby reducing unnecessary resource occupation.

Manner 2: the format of the second stage SCI sent by UE-B on slot n is 2-A; the value of the cast type indicator field in the second stage SCI is 01 (i.e., the groupcast is performed when the HARQ-ACK information includes the ACK or the NACK), or the value of the cast type indicator field in the second stage SCI is 10 (i.e., unicast); and the value of the HARQ feedback enabled/disabled indicator field in the second stage SCI is 1 (i.e., the HARQ-ACK feedback is to be activated and the ACK or the NACK is to be fed back). In the case that UE-A fails to decode the TB sent by UE-B on slot n, UE-A sends the resource conflict indication and does not feed back the HARQ-ACK feedback (i.e., NACK) for the TB on slot F.

In Manner 2, the resource conflict indication may simultaneously indicate a failure of decoding the TB sent on slot n, thereby reducing the number of PSFCHs that UE-A needs to send.

Example 4, the first information includes: whether the first terminal device successfully decodes the first TB, whether the SL feedback for the TB sent on the second time unit has been activated, and whether the first terminal device sends the HARQ-ACK feedback information for the first TB on the target time unit. The first information may further include: the format of the second stage SCI sent by the second terminal device on the second time unit, and whether the first terminal device is able to simultaneously send the resource conflict indication and the HARQ-ACK feedback information for the first TB on the target time unit.

Specifically, in Example 4, when the first terminal device sends the HARQ-ACK feedback information for the first TB on the target time unit and the SL feedback for the TB sent on the second time unit has been activated, where the SL feedback is the HARQ-ACK feedback and the SL feedback includes only the NACK, in the case that the first terminal device successfully decodes the first TB, the first terminal device determines not to send the resource conflict indication to the second terminal device on the target time unit; and/or in the case that the first terminal device fails to decode the first TB and the first terminal device is able to simultaneously send the resource conflict indication and the HARQ-ACK feedback information for the first TB on the target time unit, the first terminal device determines to send the resource conflict indication and the NACK indicating the transmission failure of the first TB to the second terminal device on the target time unit; and/or in the case that the first terminal device fails to decode the first TB and the first terminal device is unable to simultaneously send the resource conflict indication and the HARQ-ACK feedback information for the first TB on the target time unit, the first terminal device determines not to send the resource conflict indication to the second terminal device on the target time unit, and the first terminal device sends the NACK indicating the transmission failure of the first TB on the target time unit; and/or in the case that the first terminal device fails to decode the first TB, the first terminal device is unable to simultaneously send the resource conflict indication and the HARQ-ACK feedback information for the first TB on the target time unit, and only the target receiving terminal for the second terminal device is currently allowed by a resource pool to send the resource conflict indication to the second terminal device, the first terminal device determines to send the resource conflict indication to the second terminal device on the target time unit; and/or in the case that the first terminal device fails to decode the first TB, the first terminal device is unable to simultaneously send the resource conflict indication and the HARQ-ACK feedback information for the first TB on the target time unit, and another terminal besides the target receiving terminal for the second terminal device is currently allowed by the resource pool to send the resource conflict indication to the second terminal device, the first terminal device determines not to send the resource conflict indication to the second terminal device on the target time unit, and the first terminal device sends the NACK indicating the transmission failure of the first TB on the target time unit; and/or in the case that the first terminal device fails to decode the first TB and the first terminal device is unable to simultaneously send the resource conflict indication and the HARQ-ACK feedback information for the first TB on the target time unit, the first terminal device determines to send the resource conflict indication to the second terminal device on the target time unit, and when another terminal besides the target receiving terminal for the second terminal device is currently allowed by the resource pool to send the resource conflict indication to the second terminal device, resources used by the first terminal device to send the resource conflict indication are different from resources used by another terminal to send the resource conflict indication.

In Example 4, for example, the format of the second stage SCI sent by the second terminal device on the second time unit is 2-A, the value of the cast type indicator field in the second stage SCI indicates that the groupcast is performed when the HARQ-ACK information includes only the NACK, and the value of the HARQ feedback enabled/disabled indicator field in the second stage SCI indicates that the HARQ-ACK feedback is to be activated and only the NACK is able to be fed back.

In Example 4, for example, the format of the second stage SCI sent by the second terminal device on the second time unit is 2-B, and the value of the HARQ feedback enabled/disabled indicator field in the second stage SCI indicates that the HARQ-ACK feedback is to be activated and only the NACK is able to be fed back.

Specifically, for example, the first terminal device is identified as UE-A, the second terminal device is identified as UE-B, the first time unit is identified as slot m, the target time unit is identified as slot/', and the second time unit is identified as slot n. In Example 4, UE-A is the target receiving terminal for UE-B, that is, UE-A receives the TB sent by UE-B on slot n and/or slot m, UE-A sends, on slot F, the HARQ-ACK feedback for the TB sent by UE-B on slot n, and the resources reserved on slot m is used for the retransmission of the same TB sent on slot n. In this case, UE-A determines whether to send the conflict indication to UE-B on slot Fin Manner 3 to Manner 7 as follows.

Manner 3: the format of the second stage SCI sent by UE-B on slot n is 2-B, alternatively, the format of the second stage SCI sent by UE-B on slot n is 2-A and the value of the cast type indicator field in the second stage SCI is 11 (i.e., the groupcast is performed when the HARQ-ACK information includes only the NACK), and for any of the formats of the second stage SCI, the value of the HARQ feedback enabled/disabled indicator field in the second stage SCI is 1 (i.e., the HARQ-ACK feedback is to be activated and only the NACK is able to be fed back). In the case that UE-A successfully decodes the TB sent by UE-B on slot n, UE-A does not send the resource conflict indication on slot F.

Manner 4: the format of the second stage SCI sent by UE-B on slot n is 2-B, alternatively, the format of the second stage SCI sent by UE-B on slot n is 2-A and the value of the cast type indicator field in the second stage SCI is 11 (i.e., the groupcast is performed when the HARQ-ACK information includes only the NACK), and for any of the formats of the second stage SCI, the value of the HARQ feedback enabled/disabled indicator field in the second stage SCI is 1 (i.e., the HARQ-ACK feedback is to be activated and only the NACK is able to be fed back). In the case that UE-A fails to decode the TB sent by UE-B on slot n and UE-A is able to simultaneously send the HARQ-ACK information and the resource conflict indication on slot F, UE-A feeds back the NACK and sends the resource conflict indication on slot F.

Manner 5: the format of the second stage SCI sent by UE-B on slot n is 2-B, alternatively, the format of the second stage SCI sent by UE-B on slot n is 2-A and the value of the cast type indicator field in the second stage SCI is 11 (i.e., the groupcast is performed when the HARQ-ACK information includes only the NACK), and for any of the formats of the second stage SCI, the value of the HARQ feedback enabled/disabled indicator field in the second stage SCI is 1 (i.e., the HARQ-ACK feedback is to be activated and only the NACK is able to be fed back). In the case that UE-A fails to decode the TB sent by UE-B on slot n and UE-A is unable to simultaneously send the HARQ-ACK information and the resource conflict indication on slot F, UE-A only feeds back the NACK and does not send the resource conflict indication on slot F, thereby ensuring data retransmission.

Manner 6: the format of the second stage SCI sent by UE-B on slot n is 2-B, alternatively, the format of the second stage SCI sent by UE-B on slot n is 2-A and the value of the cast type indicator field in the second stage SCI is 11 (i.e., the groupcast is performed when the HARQ-ACK information includes only the NACK), and for any of the formats of the second stage SCI, the value of the HARQ feedback enabled/disabled indicator field in the second stage SCI is 1 (i.e., the HARQ-ACK feedback is to be activated and only the NACK is able to be fed back). In the case that UE-A fails to decode the TB sent by UE-B on slot n and UE-A is unable to simultaneously send the HARQ-ACK information and the resource conflict indication on slot F, when only the target receiving terminal for UE-B is currently allowed by the resource pool to send the resource conflict indication to UE-B, UE-A only sends the resource conflict indication on slot F. In this case, the resource conflict indication can trigger the retransmission and resource reselection by UE-B. Alternatively, when another terminal besides the target receiving terminal for UE-B is currently allowed by the resource pool to send the resource conflict indication to UE-B, UE-A only feeds back the NACK on slot F, thereby ensuring the data retransmission (because UE-B may consider no NACK feedback as data received successfully).

Manner 7: the format of the second stage SCI sent by UE-B on slot n is 2-B, alternatively, the format of the second stage SCI sent by UE-B on slot n is 2-A and the value of the cast type indicator field in the second stage SCI is 11 (i.e., the groupcast is performed when the HARQ-ACK information includes only the NACK), and for any of the formats of the second stage SCI, the value of the HARQ feedback enabled/disabled indicator field in the second stage SCI is 1 (i.e., the HARQ-ACK feedback is to be activated and only the NACK is able to be fed back). In the case that UE-A fails to decode the TB sent by UE-B on slot n and UE-A is unable to simultaneously send the HARQ-ACK information and the resource conflict indication on slot F, UE-A only sends the resource conflict indication on slot F. When another terminal besides the target receiving terminal for UE-B is currently allowed by the resource pool to send the resource conflict indication to UE-B, a PSFCH resource(s) used by a terminal (s) other than the target receiving terminal for UE-B to send the resource conflict indication are different from a PSFCH resource(s) used by UE-A to send the resource conflict indication.

In some embodiments, the first terminal device is the target receiving terminal for the second terminal device, the second terminal device has sent the first TB to the first terminal device on the second time unit, the reserved resources are used for new transmission of a second TB, and the second time unit is before the target time unit. Specifically, the operations at S220 may include that the first terminal device determines, according to second information, whether to send the resource conflict indication to the second terminal device on the target time unit.

Specifically, the second information includes but is not limited to at least one of: whether the first terminal device successfully decodes the first TB, whether SL feedback for the TB sent on the second time unit has been activated, the format of the second stage SCI sent by the second terminal device on the second time unit, or whether the first terminal device is able to simultaneously send the resource conflict indication and the HARQ-ACK feedback information for the first TB on the target time unit.

Specifically, for example, when the first terminal device sends feedback information for the first TB on the target time unit and the SL feedback for the TB sent on the second time unit has been activated, where the SL feedback is the HARQ-ACK feedback and the SL feedback includes the ACK or the NACK, in the case that the first terminal device is able to simultaneously send the resource conflict indication and the feedback information for the first TB on the target time unit, the first terminal device determines to send the resource conflict indication and the HARQ-ACK feedback information for the first TB to the second terminal device on the target time unit; and/or in the case that the first terminal device is unable to simultaneously send the resource conflict indication and the feedback information for the first TB on the target time unit, the first terminal device determines not to send the resource conflict indication to the second terminal device on the target time unit, and the first terminal device sends the HARQ-ACK feedback information for the first TB on the target time unit; and/or in the case that the first terminal device is unable to simultaneously send the resource conflict indication and the HARQ-ACK feedback information for the first TB on the target time unit and the first terminal device fails to decode the first TB, the first terminal device determines not to send the resource conflict indication to the second terminal device on the target time unit, and the first terminal device sends the NACK indicating the transmission failure of the first TB on the target time unit; and/or in the case that the first terminal device is unable to simultaneously send the resource conflict indication and the HARQ-ACK feedback information for the first TB on the target time unit and the first terminal device successfully decodes the first TB, the first terminal device determines to send the resource conflict indication to the second terminal device on the target time unit.

Specifically, for example, the format of the second stage SCI sent by the second terminal device on the second time unit is 2-A; the value of the cast type indicator field in the second stage SCI indicates that the groupcast is performed when the HARQ-ACK information includes the ACK or the NACK, or the value of the cast type indicator field in the second stage SCI indicates that the unicast is performed; and the value of the HARQ feedback enabled/disabled indicator field in the second stage SCI indicates that the HARQ-ACK feedback is to be activated and the ACK or the NACK is to be fed back.

Specifically, for example, the first terminal device is identified as UE-A, the second terminal device is identified as UE-B, the first time unit is identified as slot m, the target time unit is identified as slot F, and the second time unit is identified as slot n. UE-A is the target receiving terminal for UE-B, that is, UE-A receives the TB sent by UE-B on slot n and/or slot m, the resources reserved on slot m are used for new transmission of another TB, and UE-A sends, on slot F, the HARQ-ACK feedback for the TB sent by UE-B currently (i.e., the TB sent by UE-B on slot n). In this case, UE-A determines whether to send the conflict indication to UE-B on slot F in Manner 8 to Manner 10 as follows.

Manner 8: the format of the second stage SCI sent by UE-B on slot n is 2-A; the value of the cast type indicator field in the second stage SCI is 01 (i.e., the groupcast is performed when the HARQ-ACK information includes the ACK or the NACK), or the value of the cast type indicator field in the second stage SCI is 10 (i.e., unicast); and the value of the HARQ feedback enabled/disabled indicator field in the second stage SCI is 1 (i.e., the HARQ-ACK feedback is to be activated and the ACK or the NACK is to be fed back). In the case that UE-A is able to simultaneously send the HARQ-ACK feedback and the resource conflict indication on slot F, according to a decoded result of the current TB, UE-A feeds back the ACK or the NACK and sends the resource conflict indication on slot F.

Manner 9: the format of the second stage SCI sent by UE-B on slot n is 2-A; the value of the cast type indicator field in the second stage SCI is 01 (i.e., the groupcast is performed when the HARQ-ACK information includes the ACK or the NACK), or the value of the cast type indicator field in the second stage SCI is 10 (i.e., unicast); and the value of the HARQ feedback enabled/disabled indicator field in the second stage SCI is 1 (i.e., the HARQ-ACK feedback is to be activated and the ACK or the NACK is to be fed back). In the case that UE-A is unable to simultaneously send the HARQ-ACK feedback and the resource conflict indication on slot F, according to the decoded result of the current TB, UE-A only feeds back the ACK or the NACK and does not send the resource conflict indication on slot F, thereby ensuring the data retransmission.

Manner 10: the format of the second stage SCI sent by UE-B on slot n is 2-A; the value of the cast type indicator field in the second stage SCI is 01 (i.e., the groupcast is performed when the HARQ-ACK information includes the ACK or the NACK), or the value of the cast type indicator field in the second stage SCI is 10 (i.e., unicast); and the value of the HARQ feedback enabled/disabled indicator field in the second stage SCI is 1 (i.e., the HARQ-ACK feedback is to be activated and the ACK or the NACK is to be fed back). In the case that UE-A is unable to simultaneously send the HARQ-ACK feedback and the resource conflict indication on slot F and UE-A fails to decode the current TB, UE-A feeds back NACK feedback for the current TB and does not send the resource conflict indication on slot F. On the contrary, UE-A sends the resource conflict indication and does not send HARQ feedback for the current TB on slot F. In this case, the resource conflict indication may trigger UE-B to perform resource reselection to send a new TB.

In some embodiments, the first terminal device is not the target receiving terminal for the second terminal device, and the operations at S220 may include that the first terminal device determines, according to a priority of a PSFCH used for transmission of the resource conflict indication on the target time unit, whether to send the resource conflict indication to the second terminal device on the target time unit.

Specifically, for example, when the first terminal device is able to simultaneously send N PSFCHs on the target time unit and the first terminal device has M PSFCHs to-be-sent on the target time unit, where M and N are positive integers and M is greater than or equal to N, in the case that the priority of the PSFCH used for the transmission of the resource conflict indication on the target time unit among the M PSFCHs is not higher than N, the first terminal device determines to send the resource conflict indication to the second terminal device on the target time unit; and/or in the case that the priority of the PSFCH used for the transmission of the resource conflict indication on the target time unit among the M PSFCHs is higher than N, the first terminal device determines not to send the resource conflict indication to the second terminal device on the target time unit.

In some embodiments, in the case that the first terminal device determines to send the resource conflict indication to the second terminal device on the target time unit, the first terminal device sends the resource conflict indication to the second terminal device on the target time unit.

Specifically, for example, the first terminal device is identified as UE-A, the second terminal device is identified as UE-B, the first time unit is identified as slot m, the target time unit is identified as slot F. UE-B determines presence of a conflict on the resources reserved on slot m is determined after receiving the resource conflict indication. If the resources reserved by UE-B on slot m are used for retransmission of one TB, UE-B reselects a resource(s) reserved on slot m in the case that UE-B has not received ACK feedback for the TB from the target receiving terminal. Alternatively, if the resources reserved by UE-B on slot m are used for new transmission of one TB, UE-B reselects the resource(s) reserved on slot m.

Therefore, in embodiments of the disclosure, in the case that the first terminal device determines the presence of the resource conflict on the resources reserved by the second terminal device on the first time unit, the first terminal device can determine whether to send the resource conflict indication to the second terminal device on the target time unit, and the second terminal device can know a possible resource collision on resources to be used and perform resource reselection correspondingly, thereby improving reliability of SL data transmission.

Further, if the first terminal device is the target receiving terminal for the second terminal device, the first terminal device determines, according to a decoding status of the current TB and a time-domain position where the first terminal device feeds back the HARQ-ACK information to the second terminal device, whether to send the resource conflict indication to the second terminal device. If the first terminal device is not the target receiving terminal for the second terminal device, the first terminal device determines, according to sending ability and a priority of the resource conflict indication, whether to send the resource conflict indication to the second terminal device. The second terminal device determines whether to reselect the resource(s) according to the resource conflict indication and the HARQ feedback for the TB sent previously. The second terminal device can know the possible resource collision on the resources to be used and perform resource reselection correspondingly, thereby improving the reliability of the SL data transmission.

The embodiments of the disclosure at the first terminal device side are described in detail above with reference to FIG. 14, and embodiments of the disclosure at the second terminal device side will be described in detail below with reference to FIG. 15. It may be understood that, the embodiments at the second terminal device side correspond to the embodiments at the first terminal device side, and for similar illustrations, reference can be made to the embodiments at the first terminal device side.

Figure 15:
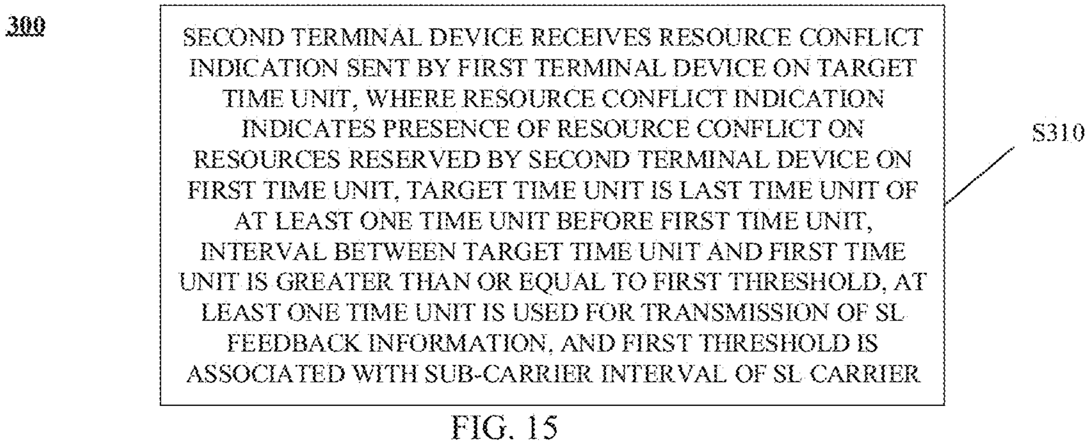
FIG. 15 is a schematic flow chart of another method for wireless communication provided in embodiments of the disclosure.

FIG. 15 is a schematic flow chart of a method 300 for wireless communication according to embodiments of the disclosure. As illustrated in FIG. 15, the method 300 for wireless communication may include at least part of the following.

At S310, a second terminal device receives a resource conflict indication sent by a first terminal device on a target time unit, where the resource conflict indication indicates presence of a resource conflict on resources reserved by the second terminal device on a first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of a SL carrier.

In some embodiments, the second terminal device reselects reserved resource on the first time unit.

In some embodiments, the first terminal device is a target receiving terminal for the second terminal device, the second terminal device has sent a first TB to the first terminal device on a second time unit, the reserved resources are used for retransmission of the first TB, the second time unit is before the target time unit, HARQ-ACK feedback for a TB sent on the second time unit has been activated, and the HARQ-ACK feedback includes an ACK or an NACK. Specifically, in the case that the second terminal device has not received an ACK sent by the first terminal device and indicating a transmission success of the first TB, the second terminal device reselects the reserved resources on the first time unit. Alternatively, in the case that the second terminal device has received an NACK sent by the first terminal device and indicating a transmission failure of the first TB, the second terminal device reselects the reserved resources on the first time unit.

In some embodiments, a format of a second stage SCI sent by the second terminal device on the second time unit is 2-A; a value of a cast type indicator field in the second stage SCI indicates that groupcast is performed when HARQ-ACK information includes the ACK or the NACK, or the value of the cast type indicator field in the second stage SCI indicates that unicast is performed; and a value of an HARQ feedback enabled/disabled indicator field in the second stage SCI indicates that the HARQ-ACK feedback is to be activated and the ACK or the NACK is to be fed back.

In some embodiments, the first terminal device is the target receiving terminal for the second terminal device, the second terminal device has sent the first TB to the first terminal device on the second time unit, the reserved resources are used for the retransmission of the first TB, the second time unit is before the target time unit, the HARQ-ACK feedback for the TB sent on the second time unit has been activated, and the HARQ-ACK feedback includes only the NACK. Specifically, in the case that the second terminal device has received the NACK sent by the first terminal device and indicating the transmission failure of the first TB, the second terminal device reselects the reserved resources on the first time unit.

In some embodiments, the format of the second stage SCI sent by the second terminal device on the second time unit is 2-A, the value of the cast type indicator field in the second stage SCI indicates that the groupcast is performed when the HARQ-ACK information includes only the NACK, and the value of the HARQ feedback enabled/disabled indicator field in the second stage SCI indicates that the HARQ-ACK feedback is to be activated and only the NACK is able to be fed back.

In some embodiments, the format of the second stage SCI sent by the second terminal device on the second time unit is 2-B, and the value of the HARQ feedback enabled/disabled indicator field in the second stage SCI indicates that the HARQ-ACK feedback is to be activated and only the NACK is able to be fed back In some embodiments, HARQ-ACK feedback information for the first TB is sent on the target time unit. Alternatively, the HARQ-ACK feedback information for the first TB is sent on a time unit other than the target time unit.

In some embodiments, the first terminal device is the target receiving terminal for the second terminal device, the second terminal device has sent the first TB to the first terminal device on the second time unit, the reserved resources are used for new transmission of a second TB, and the second time unit is before the target time unit. Specifically, the second terminal device reselects the reserved resources on the first time unit.

Therefore, in embodiments of the disclosure, in the case that the first terminal device determines the presence of the resource conflict on the resources reserved by the second terminal device on the first time unit, the first terminal device can determine whether to send the resource conflict indication to the second terminal device on the target time unit, and the second terminal device can know a possible resource collision on resources to be used and perform resource reselection correspondingly, thereby improving reliability of SL data transmission.

The method embodiments of the disclosure are described in detail above with reference to FIG. 14 to FIG. 15, and apparatus embodiments of the disclosure will be described in detail below with reference to FIG. 16 to FIG. 20. It may be understood that, the apparatus embodiments correspond to the method embodiments, and for similar illustrations, reference can be made to the method embodiments.

Figure 16:
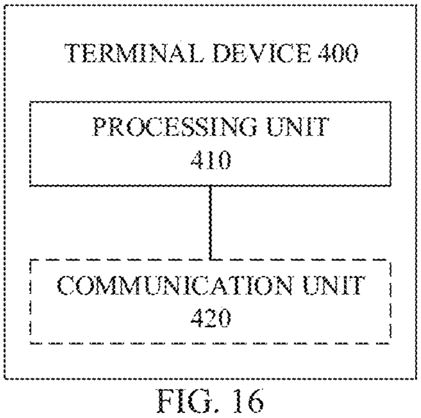
FIG. 16 is a schematic block diagram of a terminal device provided in embodiments of the disclosure.

FIG. 16 illustrates a schematic block diagram of a terminal device 400 according to embodiments of the disclosure. The terminal device 400 is a first terminal device. As illustrated in FIG. 16, the terminal device 400 includes a processing unit 410. The processing unit 410 is configured to determine presence of a resource conflict on resources reserved by a second terminal device on a first time unit. The processing unit 410 is further configured to determine whether to send a resource conflict indication to the second terminal device on a target time unit. The resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of a SL carrier.

In some embodiments, the first terminal device is a target receiving terminal for the second terminal device, the second terminal device has sent a first TB to the first terminal device on a second time unit, the reserved resources are used for retransmission of the first TB, and the second time unit is before the target time unit. The processing unit 410 is specifically configured to determine, according to first information, whether to send the resource conflict indication to the second terminal device on the target time unit. The first information includes at least one of: whether the first terminal device successfully decodes the first TB, whether SL feedback for a TB sent on the second time unit has been activated, a format of a second stage SCI sent by the second terminal device on the second time unit, whether the first terminal device sends HARQ-ACK feedback information for the first TB on the target time unit, or whether the first terminal device is able to simultaneously send the resource conflict indication and the HARQ-ACK feedback information for the first TB on the target time unit.

In some embodiments, the processing unit 410 is specifically configured to operate as follows. When the first terminal device does not send the HARQ-ACK feedback information for the first TB on the target time unit and the SL feedback for the TB sent on the second time unit has been activated, in the case that the first terminal device fails to decode the first TB, the processing unit 410 is specifically configured to determine to send the resource conflict indication to the second terminal device on the target time unit; and/or in the case that the first terminal device successfully decodes the first TB, the processing unit 410 is specifically configured to determine not to send the resource conflict indication to the second terminal device on the target time unit.

In some embodiments, the processing unit 410 is specifically configured to operate as follows. When the first terminal device does not send the HARQ-ACK feedback information for the first TB on the target time unit and the SL feedback for the TB sent on the second time unit has not been activated, the processing unit 410 is specifically configured to determine to send the resource conflict indication to the second terminal device on the target time unit.

In some embodiments, the processing unit 410 is specifically configured to operate as follows. When the first terminal device sends the HARQ-ACK feedback information for the first TB on the target time unit and the SL feedback for the TB sent on the second time unit has been activated, where the SL feedback is HARQ-ACK feedback and the SL feedback includes an ACK or an NACK, in the case that the first terminal device successfully decodes the first TB, the processing unit 410 is specifically configured to determine not to send the resource conflict indication to the second terminal device on the target time unit and send, by the first terminal device, an ACK indicating a transmission success of the first TB on the target time unit; and/or in the case that the first terminal device fails to decode the first TB, the processing unit 410 is specifically configured to send the resource conflict indication to the second terminal device on the target time unit and skip sending, by the first terminal device an NACK indicating a transmission failure of the first TB on the target time unit.

In some embodiments, the format of the second stage SCI sent by the second terminal device on the second time unit is 2-A; a value of a cast type indicator field in the second stage SCI indicates that groupcast is performed when HARQ-ACK information includes the ACK or the NACK, or the value of the cast type indicator field in the second stage SCI indicates that unicast is performed; and a value of an HARQ feedback enabled/disabled indicator field in the second stage SCI indicates that the HARQ-ACK feedback is to be activated and the ACK or the NACK is to be fed back.

In some embodiments, the processing unit 410 is specifically configured to operate as follows. When the first terminal device sends the HARQ-ACK feedback information for the first TB on the target time unit and the SL feedback for the TB sent on the second time unit has been activated, where the SL feedback is the HARQ-ACK feedback and the SL feedback includes only the NACK, in the case that the first terminal device successfully decodes the first TB, the processing unit 410 is specifically configured to determine not to send the resource conflict indication to the second terminal device on the target time unit; and/or in the case that the first terminal device fails to decode the first TB and the first terminal device is able to simultaneously send the resource conflict indication and the HARQ-ACK feedback information for the first TB on the target time unit, the processing unit 410 is specifically configured to determine to send the resource conflict indication and the NACK indicating the transmission failure of the first TB to the second terminal device on the target time unit; and/or in the case that the first terminal device fails to decode the first TB and the first terminal device is unable to simultaneously send the resource conflict indication and the HARQ-ACK feedback information for the first TB on the target time unit, the processing unit 410 is specifically configured to determine not to send the resource conflict indication to the second terminal device on the target time unit and send, by the first terminal device, the NACK indicating the transmission failure of the first TB on the target time unit; and/or in the case that the first terminal device fails to decode the first TB and the first terminal device is unable to simultaneously send the resource conflict indication and the HARQ-ACK feedback information for the first TB on the target time unit, when only the target receiving terminal for the second terminal device is currently allowed by a resource pool to send the resource conflict indication to the second terminal device, the processing unit 410 is specifically configured to determine to send the resource conflict indication to the second terminal device on the target time unit; and/or in the case that the first terminal device fails to decode the first TB and the first terminal device is unable to simultaneously send the resource conflict indication and the HARQ-ACK feedback information for the first TB on the target time unit, when another terminal besides the target receiving terminal for the second terminal device is currently allowed by the resource pool to send the resource conflict indication to the second terminal device, the processing unit 410 is specifically configured to determine not to send the resource conflict indication to the second terminal device on the target time unit and send, by the first terminal device, the NACK indicating the transmission failure of the first TB on the target time unit; and/or in the case that the first terminal device fails to decode the first TB and the first terminal device is unable to simultaneously send the resource conflict indication and the HARQ-ACK feedback information for the first TB on the target time unit, the processing unit 410 is specifically configured to determine to send the resource conflict indication to the second terminal device on the target time unit, and when another terminal besides the target receiving terminal for the second terminal device is currently allowed by the resource pool to send the resource conflict indication to the second terminal device, resources used by the first terminal device to send the resource conflict indication are different from resources used by another terminal to send the resource conflict indication.

In some embodiments, the format of the second stage SCI sent by the second terminal device on the second time unit is 2-A, the value of the cast type indicator field in the second stage SCI indicates that the groupcast is performed when the HARQ-ACK information includes only the NACK, and the value of the HARQ feedback enabled/disabled indicator field in the second stage SCI indicates that the HARQ-ACK feedback is to be activated and only the NACK is able to be fed back. Alternatively, the format of the second stage SCI sent by the second terminal device on the second time unit is 2-B, and the value of the HARQ feedback enabled/disabled indicator field in the second stage SCI indicates that the HARQ-ACK feedback is to be activated and only the NACK is able to be fed back.

In some embodiments, the first terminal device is the target receiving terminal for the second terminal device, the second terminal device has sent the first TB to the first terminal device on the second time unit, the reserved resources are used for new transmission of a second TB, and the second time unit is before the target time unit. The processing unit 410 is specifically configured to determine, according to second information, whether to send the resource conflict indication to the second terminal device on the target time unit. The second information includes at least one of: whether the first terminal device successfully decodes the first TB, whether the SL feedback for the TB sent on the second time unit has been activated, the format of the second stage SCI sent by the second terminal device on the second time unit, or whether the first terminal device is able to simultaneously send the resource conflict indication and the HARQ-ACK feedback information for the first TB on the target time unit.

In some embodiments, the processing unit 410 is specifically configured to operate as follows. When the first terminal device sends feedback information for the first TB on the target time unit and the SL feedback for the TB sent on the second time unit has been activated, where the SL feedback is the HARQ-ACK feedback and the SL feedback includes the ACK or the NACK, in the case that the first terminal device is able to simultaneously send the resource conflict indication and the feedback information for the first TB on the target time unit, the processing unit 410 is specifically configured to determine to send the resource conflict indication and the HARQ-ACK feedback information for the first TB to the second terminal device on the target time unit; and/or in the case that the first terminal device is unable to simultaneously send the resource conflict indication and the feedback information for the first TB on the target time unit, the processing unit 410 is specifically configured to determine not to send the resource conflict indication to the second terminal device on the target time unit and send, by the first terminal device, the HARQ-ACK feedback information for the first TB on the target time unit; and/or in the case that the first terminal device is unable to simultaneously send the resource conflict indication and the HARQ-ACK feedback information for the first TB on the target time unit and the first terminal device fails to decode the first TB, the processing unit 410 is specifically configured to determine not to send the resource conflict indication to the second terminal device on the target time unit and send, by the first terminal device, the NACK indicating the transmission failure of the first TB on the target time unit; and/or in the case that the first terminal device is unable to simultaneously send the resource conflict indication and the HARQ-ACK feedback information for the first TB on the target time unit and the first terminal device successfully decodes the first TB, the processing unit 410 is specifically configured to determine to send the resource conflict indication to the second terminal device on the target time unit.

In some embodiments, the format of the second stage SCI sent by the second terminal device on the second time unit is 2-A; the value of the cast type indicator field in the second stage SCI indicates that the groupcast is performed when the HARQ-ACK information includes the ACK or the NACK, or the value of the cast type indicator field in the second stage SCI indicates that the unicast is performed; and the value of the HARQ feedback enabled/disabled indicator field in the second stage SCI indicates that the HARQ-ACK feedback is to be activated and the ACK or the NACK is to be fed back.

In some embodiments, the first terminal device is not the target receiving terminal for the second terminal device. The processing unit 410 is specifically configured to determine, according to a priority of a PSFCH used for transmission of the resource conflict indication on the target time unit, whether to send the resource conflict indication to the second terminal device on the target time unit.

In some embodiments, the processing unit 410 is specifically configured to operate as follows. When the first terminal device is able to simultaneously send N PSFCHs on the target time unit and the first terminal device has M PSFCHs to-be-sent on the target time unit, where M and N are positive integers and M is greater than or equal to N, in the case that the priority of the PSFCH used for the transmission of the resource conflict indication on the target time unit among the M PSFCHs is not higher than N, the processing unit is specifically configured to determine to send the resource conflict indication to the second terminal device on the target time unit; and/or in the case that the priority of the PSFCH used for the transmission of the resource conflict indication on the target time unit among the M PSFCHs is higher than N, the processing unit is specifically configured to determine not to send the resource conflict indication to the second terminal device on the target time unit.

In some embodiments, in the case that the first terminal device determines to send the resource conflict indication to the second terminal device on the target time unit, the terminal device 400 further includes a communication unit 420. The communication unit 420 is further configured to send the resource conflict indication to the second terminal device on the target time unit.

In some embodiments, a time unit is one of a slot or a symbol.

In some embodiments, the communication unit above may be a communication interface or a transceiver, or may be an input/output interface of a communication chip or an SoC. The processing unit above may be one or more processors.

It may be understood that, the terminal device 400 according to embodiments of the disclosure may correspond to the first terminal device in the method embodiments of the disclosure, and the foregoing and other operations and/or functions of various units in the terminal device 400 are respectively intended for implementing corresponding procedures of the first terminal device in the method 200 illustrated in FIG. 14, which will not be repeated herein for the sake of simplicity.

Figure 17:
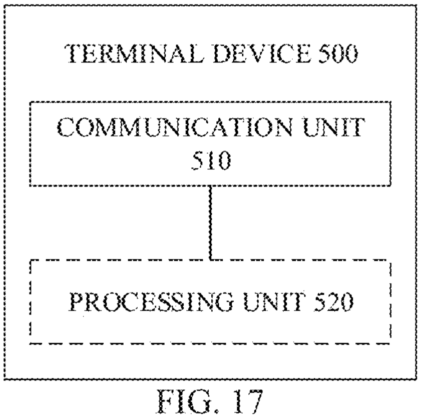
FIG. 17 is a schematic block diagram of another terminal device provided in embodiments of the disclosure.

FIG. 17 illustrates a schematic block diagram of a terminal device 500 according to embodiments of the disclosure. The terminal device 500 is a second terminal device. As illustrated in FIG. 17, the terminal device 500 includes a communication unit 510. The communication unit 510 is configured to receive a resource conflict indication sent by a first terminal device on a target time unit. The resource conflict indication indicates presence of a resource conflict on resources reserved by the second terminal device on a first time unit, the target time unit is a last time unit of at least one time unit before the first time unit, an interval between the target time unit and the first time unit is greater than or equal to a first threshold, the at least one time unit is used for transmission of SL feedback information, and the first threshold is associated with a sub-carrier interval of an SL carrier.

In some embodiments, the terminal device 500 further includes a processing unit 520. The processing unit 520 is configured to reselect reserved resource on the first time unit.

In some embodiments, the first terminal device is a target receiving terminal for the second terminal device, the second terminal device has sent a first TB to the first terminal device on a second time unit, the reserved resources are used for retransmission of the first TB, the second time unit is before the target time unit, HARQ-ACK feedback for a TB sent on the second time unit has been activated, and the HARQ-ACK feedback includes an ACK or an NACK. The terminal device 500 further includes the processing unit 520. In the case that the second terminal device has not received an ACK sent by the first terminal device and indicating a transmission success of the first TB, the processing unit 520 is configured to reselect the reserved resources on the first time unit. Alternatively, in the case that the second terminal device has received an NACK sent by the first terminal device and indicating a transmission failure of the first TB, the processing unit 520 is configured to reselect the reserved resources on the first time unit.

In some embodiments, a format of a second stage SCI sent by the second terminal device on the second time unit is 2-A; a value of a cast type indicator field in the second stage SCI indicates that groupcast is performed when HARQ-ACK information includes the ACK or the NACK, or the value of the cast type indicator field in the second stage SCI indicates that unicast is performed; and a value of an HARQ feedback enabled/disabled indicator field in the second stage SCI indicates that the HARQ-ACK feedback is to be activated and the ACK or the NACK is to be fed back.

In some embodiments, the first terminal device is the target receiving terminal for the second terminal device, the second terminal device has sent the first TB to the first terminal device on the second time unit, the reserved resources are used for the retransmission of the first TB, the second time unit is before the target time unit, the HARQ-ACK feedback for the TB sent on the second time unit has been activated, and the HARQ-ACK feedback includes only the NACK. The terminal device 500 further includes the processing unit 520. In the case that the second terminal device has received the NACK sent by the first terminal device and indicating the transmission failure of the first TB, the processing unit 520 is configured to reselect the reserved resources on the first time unit.

In some embodiments, the format of the second stage SCI sent by the second terminal device on the second time unit is 2-A, the value of the cast type indicator field in the second stage SCI indicates that the groupcast is performed when the HARQ-ACK information includes only the NACK, and the value of the HARQ feedback enabled/disabled indicator field in the second stage SCI indicates that the HARQ-ACK feedback is to be activated and only the NACK is able to be fed back. Alternatively, the format of the second stage SCI sent by the second terminal device on the second time unit is 2-B, and the value of the HARQ feedback enabled/disabled indicator field in the second stage SCI indicates that the HARQ-ACK feedback is to be activated and only the NACK is able to be fed back.

In some embodiments, HARQ-ACK feedback information for the first TB is sent on the target time unit. Alternatively, the HARQ-ACK feedback information for the first TB is sent on a time unit other than the target time unit.

In some embodiments, the first terminal device is the target receiving terminal for the second terminal device, the second terminal device has sent the first TB to the first terminal device on the second time unit, the reserved resources are used for new transmission of a second TB, and the second time unit is before the target time unit. The terminal device 500 further includes the processing unit 520. The processing unit 520 is configured to reselect the reserved resources on the first time unit.

In some embodiments, a time unit is one of a slot or a symbol.

In some embodiments, the communication unit above may be a communication interface or a transceiver, or may be an input/output interface of a communication chip or an SoC. The processing unit may be one or more processors.

It may be understood that, the terminal device 500 according to embodiments of the disclosure may correspond to the second terminal device in the method embodiments of the disclosure, and the foregoing and other operations and/or functions of various units in the terminal device 500 are respectively intended for implementing corresponding procedures of the second terminal device in the method 300 illustrated in FIG. 15, which will not be repeated herein for the sake of simplicity.

Figure 18:
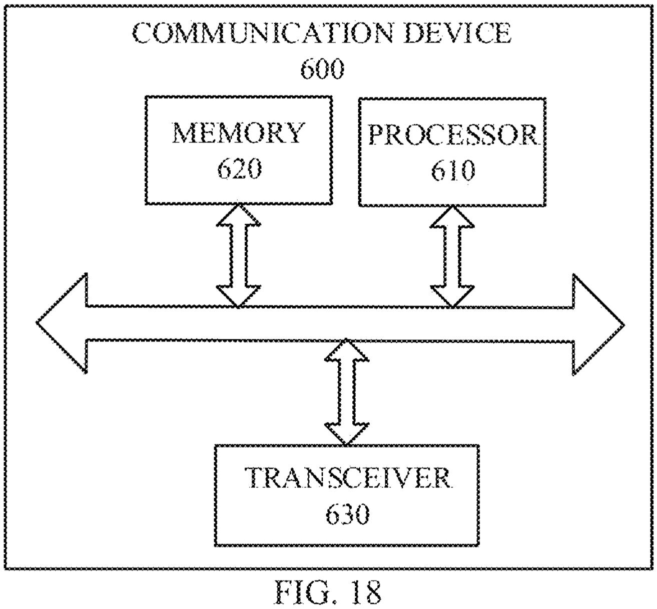
FIG. 18 is a schematic block diagram of a communication device provided in embodiments of the disclosure.

FIG. 18 is a schematic structural diagram of a communication device 600 provided in embodiments of the disclosure. The communication device 600 as illustrated in FIG. 18 includes a processor 610. The processor 610 can invoke and execute a computer program stored in a memory, so as to implement the method in embodiments of the disclosure.

In some embodiments, as illustrated in FIG. 18, the communication device 600 may further include a memory 620. The processor 610 can invoke and execute a computer program stored in the memory 620, so as to implement the method in embodiments of the disclosure.

The memory 620 may be a separate device independent of the processor 610, or may be integrated into the processor 610.

In some embodiments, as illustrated in FIG. 18, the communication device 600 may further include a transceiver 630. The processor 610 can control the transceiver 630 to communicate with other devices, specifically, to send information or data to other devices or to receive information or data from other devices.

The transceiver 630 may include a transmitter and a receiver. The transceiver 630 may further include an antenna, where one or more antennas may be provided.

In some embodiments, the communication device 600 may specifically be the first terminal device in embodiments of the disclosure, and the communication device 600 may implement corresponding operations implemented by the first terminal device in various methods in embodiments of the disclosure, which will not be repeated herein for the sake of simplicity.

In some embodiments, the communication device 600 may specifically be the second terminal device in embodiments of the disclosure, and the communication device 600 may implement corresponding operations implemented by the second terminal device in various methods in embodiments of the disclosure, which will not be repeated herein for the sake of simplicity.

Figure 19:
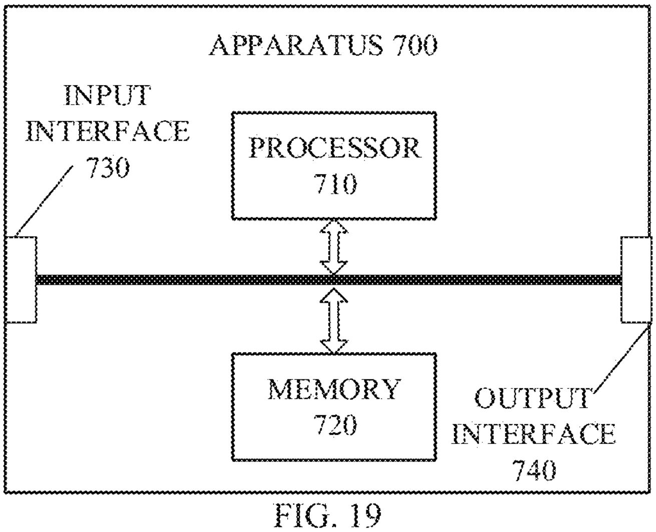
FIG. 19 is a schematic block diagram of an apparatus provided in embodiments of the disclosure.

FIG. 19 is a schematic structural diagram of an apparatus provided in embodiments of the disclosure. The apparatus 700 illustrated in FIG. 19 includes a processor 710. The processor 710 can invoke and execute a computer program stored in a memory, so as to implement the method in embodiments of the disclosure.

In some embodiments, as illustrated in FIG. 19, the apparatus 700 may further include a memory 720. The processor 710 can invoke and execute a computer program stored in the memory 720, so as to implement the method in embodiments of the disclosure.

The memory 720 may be a separate device independent of the processor 710, or may be integrated into the processor 710.

In some embodiments, the apparatus 700 may further include an input interface 730. The processor 710 can control the input interface 730 to communicate with other devices or chips, and specifically, to obtain information or data sent by other devices or chips.

In some embodiments, the apparatus 700 may further include an output interface 740. The processor 710 can control the output interface 740 to communicate with other devices or chips, and specifically, to output information or data to other devices or chips.

In some embodiments, the apparatus may be applied to the first terminal device in embodiments of the disclosure, and the apparatus may implement corresponding operations implemented by the first terminal device in various methods in embodiments of the disclosure, which will not be repeated herein for the sake of simplicity.

In some embodiments, the apparatus may be applied to the second terminal device in embodiments of the disclosure, and the apparatus may implement corresponding operations implemented by the second terminal device in various methods in embodiments of the disclosure, which will not be repeated herein for the sake of simplicity.

In some embodiments, the apparatus in embodiments of the disclosure may also be a chip, for example, an SoC.

Figure 20:
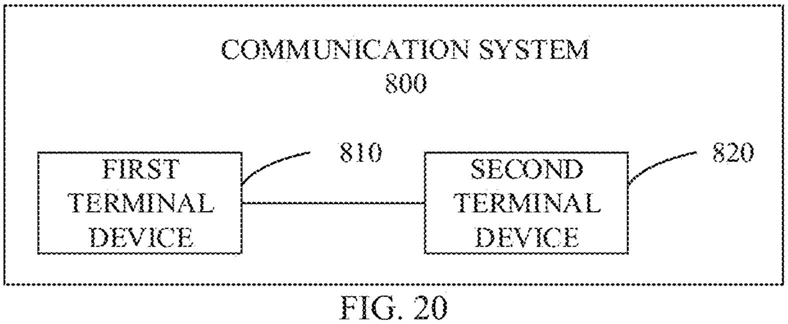
FIG. 20 is a schematic block diagram of a communication system provided in embodiments of the disclosure.

FIG. 20 is a schematic block diagram of a communication system 800 provided in embodiments of the disclosure. As illustrated in FIG. 20, the communication system 800 includes a first terminal device 810 and a second terminal device 820.

The first terminal device 810 may be configured to implement corresponding functions implemented by the first terminal device in the foregoing methods, and the second terminal device 820 may be configured to implement corresponding functions implemented by the second terminal device in the foregoing methods, which will not be repeated herein for the sake of simplicity.

It may be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an application-specific integrated circuit (ASIC), a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium mature in the skill such as a random access memory (RAM), a flash memory, a read-only memory (ROM), a programmable ROM (PROM), or an electrically erasable programmable memory, registers, and the like. The storage medium is located in the memory. The processor reads the information in the memory, and completes the steps of the method described above with the hardware of the processor.

It may be understood that, the memory in embodiments of the disclosure may be a volatile memory or a non-volatile memory, or may include both the volatile memory and the non-volatile memory. The non-volatile memory may be an ROM, a PROM, an erasable PROM (EPROM), an electrically EPROM (EEPROM), or a flash memory. The volatile memory may be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It may be noted that, the memory of the systems and methods described in the disclosure is intended to include, but is not limited to, these and any other suitable types of memory.

It may be understood that, the memory above is intended for illustration rather than limitation. For example, the memory in embodiments of the disclosure may also be an SRAM, a DRAM, an SDRAM, a DDR SDRAM, an ESDRAM, an SLDRAM, a DR RAM, or the like. In other words, the memory in embodiments of the disclosure is intended to include, but is not limited to, these and any other suitable types of memory.

A computer-readable storage medium is further provided in embodiments of the disclosure. The computer-readable storage medium is configured to store a computer program.

In some embodiments, the computer-readable storage medium may be applied to the first terminal device in embodiments of the disclosure, and the computer program is operable with a computer to execute corresponding operations implemented by the first terminal device in various methods in embodiments of the disclosure, which will not be repeated herein for the sake of simplicity.

In some embodiments, the computer-readable storage medium may be applied to the second terminal device in embodiments of the disclosure, and the computer program is operable with a computer to execute corresponding operations implemented by the second terminal device in various methods in embodiments of the disclosure, which will not be repeated herein for the sake of simplicity.

A computer program product is further provided in embodiments of the disclosure. The computer program product includes computer program instructions.

In some embodiments, the computer program product may be applied to the first terminal device in embodiments of the disclosure, and the computer program instructions are operable with a computer to execute corresponding operations implemented by the first terminal device in various methods in embodiments of the disclosure, which will not be repeated herein for the sake of simplicity.

In some embodiments, the computer program product may be applied to the second terminal device in embodiments of the disclosure, and the computer program instructions are operable with a computer to execute corresponding operations implemented by the second terminal device in various methods in embodiments of the disclosure, which will not be repeated herein for the sake of simplicity.

A computer program is further provided in embodiments of the disclosure.

In some embodiments, the computer program may be applied to the first terminal device in embodiments of the disclosure. The computer program, when executed by a computer, is operable with the computer to implement corresponding operations implemented by the first terminal device in various methods in embodiments of the disclosure, which will not be repeated herein for the sake of simplicity.

In some embodiments, the computer program may be applied to the second terminal device in embodiments of the disclosure. The computer program, when executed by a computer, is operable with the computer to implement corresponding operations implemented by the second terminal device in various methods in embodiments of the disclosure, which will not be repeated herein for the sake of simplicity.

It will be appreciated by those of ordinary skill in the art that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, an ROM, an RAM, a magnetic disk, or an optical disk.

The foregoing elaborations are merely embodiments of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A method for wireless communication, comprising:

determining, by a first terminal device, presence of a resource conflict on resources reserved by a second terminal device on a first time unit; and determining, by the first terminal device, whether to send a resource conflict indication to the second terminal device on a target time unit;

wherein the resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of sidelink (SL) feedback information, and the first threshold is associated with a sub-carrier interval of a SL carrier; and wherein in response to the first terminal device being not a target receiving terminal for the second terminal device, determining, by the first terminal device, whether to send the resource conflict indication to the second terminal device on the target time unit comprises:

determining, by the first terminal device, according to a priority of a physical SL feedback channel (PSFCH) used for transmission of the resource conflict indication on the target time unit, whether to send the resource conflict indication to the second terminal device on the target time unit.

2. The method of claim 1, wherein:

in response to the first terminal device being a target receiving terminal for the second terminal device, the second terminal device has sent a first transmission block (TB) to the first terminal device on a second time unit, the reserved resources are used for retransmission of the first TB, and the second time unit is before the target time unit; and determining, by the first terminal device, whether to send the resource conflict indication to the second terminal device on the target time unit comprises:

determining, by the first terminal device according to first information, whether to send the resource conflict indication to the second terminal device on the target time unit, wherein the first information comprises at least one of:

whether the first terminal device successfully decodes the first TB, whether SL feedback for a TB sent on the second time unit has been activated, a format of a second stage SL control information (SCI) sent by the second terminal device on the second time unit, whether the first terminal device sends hybrid automatic repeat reQuest acknowledgement (HARQ-ACK) feedback information for the first TB on the target time unit, or whether the first terminal device is able to simultaneously send the resource conflict indication and the HARQ-ACK feedback information for the first TB on the target time unit.

3. The method of claim 2, wherein determining, by the first terminal device according to the first information, whether to send the resource conflict indication to the second terminal device on the target time unit comprises:

when the first terminal device does not send the HARQ-ACK feedback information for the first TB on the target time unit and the SL feedback for the TB sent on the second time unit has been activated;

in a case that the first terminal device fails to decode the first TB, determining, by the first terminal device, to send the resource conflict indication to the second terminal device on the target time unit; and/or in a case that the first terminal device successfully decodes the first TB, determining, by the first terminal device, not to send the resource conflict indication to the second terminal device on the target time unit.

4. The method of claim 2, wherein determining, by the first terminal device according to the first information, whether to send the resource conflict indication to the second terminal device on the target time unit comprises:

when the first terminal device does not send the HARQ-ACK feedback information for the first TB on the target time unit and the SL feedback for the TB sent on the second time unit has not been activated, determining, by the first terminal device, to send the resource conflict indication to the second terminal device on the target time unit.

5. The method of claim 2, wherein determining, by the first terminal device according to the first information, whether to send the resource conflict indication to the second terminal device on the target time unit comprises:

when the first terminal device sends the HARQ-ACK feedback information for the first TB on the target time unit and the SL feedback for the TB sent on the second time unit has been activated, wherein the SL feedback is HARQ-ACK feedback, and the SL feedback comprises an acknowledgement (ACK) or a negative acknowledgement (NACK);

in a case that the first terminal device successfully decodes the first TB, determining, by the first terminal device, not to send the resource conflict indication to the second terminal device on the target time unit, and sending, by the first terminal device, an ACK indicating a transmission success of the first TB on the target time unit; and/or in a case that the first terminal device fails to decode the first TB, determining, by the first terminal device, to send the resource conflict indication to the second terminal device on the target time unit, and skipping sending, by the first terminal device, an NACK indicating a transmission failure of the first TB on the target time unit.

6. The method of claim 5, wherein the format of the second stage SCI sent by the second terminal device on the second time unit is 2-A; a value of a cast type indicator field in the second stage SCI indicates that groupcast is performed when HARQ-ACK information comprises the ACK or the NACK, or the value of the cast type indicator field in the second stage SCI indicates that unicast is performed; and a value of an HARQ feedback enabled/disabled indicator field in the second stage SCI indicates that the HARQ-ACK feedback is to be activated and the ACK or the NACK is to be fed back.

7. The method of claim 2, wherein determining, by the first terminal device according to the first information, whether to send the resource conflict indication to the second terminal device on the target time unit comprises:

when the first terminal device sends the HARQ-ACK feedback information for the first TB on the target time unit and the SL feedback for the TB sent on the second time unit has been activated, wherein the SL feedback is HARQ-ACK feedback, and the SL feedback comprises only an NACK;

in a case that the first terminal device successfully decodes the first TB, determining, by the first terminal device, not to send the resource conflict indication to the second terminal device on the target time unit; and/or in a case that the first terminal device fails to decode the first TB and the first terminal device is able to simultaneously send the resource conflict indication and the HARQ-ACK feedback information for the first TB on the target time unit, determining, by the first terminal device, to send the resource conflict indication and an NACK indicating a transmission failure of the first TB to the second terminal device on the target time unit; and/or in a case that the first terminal device fails to decode the first TB and the first terminal device is unable to simultaneously send the resource conflict indication and the HARQ-ACK feedback information for the first TB on the target time unit, determining, by the first terminal device, not to send the resource conflict indication to the second terminal device on the target time unit, and sending, by the first terminal device, the NACK indicating the transmission failure of the first TB on the target time unit; and/or in a case that the first terminal device fails to decode the first TB and the first terminal device is unable to simultaneously send the resource conflict indication and the HARQ-ACK feedback information for the first TB on the target time unit, when only the target receiving terminal for the second terminal device is currently allowed by a resource pool to send the resource conflict indication to the second terminal device, determining, by the first terminal device, to send the resource conflict indication to the second terminal device on the target time unit; and/or in a case that the first terminal device fails to decode the first TB and the first terminal device is unable to simultaneously send the resource conflict indication and the HARQ-ACK feedback information for the first TB on the target time unit, when another terminal besides the target receiving terminal for the second terminal device is currently allowed by the resource pool to send the resource conflict indication to the second terminal device, determining, by the first terminal device, not to send the resource conflict indication to the second terminal device on the target time unit, and sending, by the first terminal device, the NACK indicating the transmission failure of the first TB on the target time unit; and/or in a case that the first terminal device fails to decode the first TB and the first terminal device is unable to simultaneously send the resource conflict indication and the HARQ-ACK feedback information for the first TB on the target time unit, determining, by the first terminal device, to send the resource conflict indication to the second terminal device on the target time unit, and when another terminal besides the target receiving terminal for the second terminal device is currently allowed by the resource pool to send the resource conflict indication to the second terminal device, resources used by the first terminal device to send the resource conflict indication are different from resources used by another terminal to send the resource conflict indication.

8. The method of claim 1, wherein:

in response to the first terminal device being a target receiving terminal for the second terminal device, the second terminal device has sent a first TB to the first terminal device on a second time unit, the reserved resources are used for new transmission of a second TB, and the second time unit is before the target time unit; and determining, by the first terminal device, whether to send the resource conflict indication to the second terminal device on the target time unit comprises:

determining, by the first terminal device according to second information, whether to send the resource conflict indication to the second terminal device on the target time unit, wherein the second information comprises at least one of:

whether the first terminal device successfully decodes the first TB, whether SL feedback for a TB sent on the second time unit has been activated, a format of a second stage SCI sent by the second terminal device on the second time unit, or whether the first terminal device is able to simultaneously send the resource conflict indication and HARQ-ACK feedback information for the first TB on the target time unit.

9. The method of claim 8, wherein determining, by the first terminal device according to the second information, whether to send the resource conflict indication to the second terminal device on the target time unit comprises:

when the first terminal device sends feedback information for the first TB on the target time unit and the SL feedback for the TB sent on the second time unit has been activated, wherein the SL feedback is HARQ-ACK feedback, and the SL feedback comprises an ACK or an NACK;

in a case that the first terminal device is able to simultaneously send the resource conflict indication and the feedback information for the first TB on the target time unit, determining, by the first terminal device, to send the resource conflict indication and the HARQ-ACK feedback information for the first TB to the second terminal device on the target time unit; and/or in a case that the first terminal device is unable to simultaneously send the resource conflict indication and the feedback information for the first TB on the target time unit, determining, by the first terminal device, not to send the resource conflict indication to the second terminal device on the target time unit, and sending, by the first terminal device, the HARQ-ACK feedback information for the first TB on the target time unit; and/or in a case that the first terminal device is unable to simultaneously send the resource conflict indication and the HARQ-ACK feedback information for the first TB on the target time unit and the first terminal device fails to decode the first TB, determining, by the first terminal device, not to send the resource conflict indication to the second terminal device on the target time unit, and sending, by the first terminal device, an NACK indicating a transmission failure of the first TB on the target time unit; and/or in a case that the first terminal device is unable to simultaneously send the resource conflict indication and the HARQ-ACK feedback information for the first TB on the target time unit and the first terminal device successfully decodes the first TB, determining, by the first terminal device, to send the resource conflict indication to the second terminal device on the target time unit.

10. The method of claim 1, wherein determining, by the first terminal device according to the priority of the PSFCH used for the transmission of the resource conflict indication on the target time unit, whether to send the resource conflict indication to the second terminal device on the target time unit comprises:

when the first terminal device is able to simultaneously send N PSFCHs on the target time unit and the first terminal device has M PSFCHs to-be-sent on the target time unit, wherein M and N are positive integers, and Mis greater than or equal to N;

in a case that the priority of the PSFCH used for the transmission of the resource conflict indication on the target time unit among the M PSFCHs is not higher than N, determining, by the first terminal device, to send the resource conflict indication to the second terminal device on the target time unit; and/or in a case that the priority of the PSFCH used for the transmission of the resource conflict indication on the target time unit among the M PSFCHs is higher than N, determining, by the first terminal device, not to send the resource conflict indication to the second terminal device on the target time unit.

11. The method of claim 1, wherein in a case that the first terminal device determines to send the resource conflict indication to the second terminal device on the target time unit, the method further comprises:

sending, by the first terminal device, the resource conflict indication to the second terminal device on the target time unit.

12. The method of claim 1, wherein a time unit is one of a slot or a symbol.

13. A method for wireless communication, comprising:

receiving, by a second terminal device, a resource conflict indication sent by a first terminal device on a target time unit;

wherein the resource conflict indication indicates presence of a resource conflict on resources reserved by the second terminal device on a first time unit, the target time unit is a last time unit of at least one time unit before the first time unit, an interval between the target time unit and the first time unit is greater than or equal to a first threshold, the at least one time unit is used for transmission of sidelink (SL) feedback information, and the first threshold is associated with a sub-carrier interval of a SL carrier;

in response to the first terminal device being not a target receiving terminal for the second terminal device, the resource conflict indication is determined by the first terminal device to be sent to the second terminal device on the target time unit according to a priority of a physical SL feedback channel (PSFCH) used for transmission of the resource conflict indication on the target time unit.

14. The method of claim 13, further comprising:

reselecting, by the second terminal device, reserved resources on the first time unit.

15. The method of claim 13, wherein:

in response to the first terminal device being a target receiving terminal for the second terminal device, the second terminal device has sent a first transmission block (TB) to the first terminal device on a second time unit, the reserved resources are used for retransmission of the first TB, the second time unit is before the target time unit, hybrid automatic repeat reQuest acknowledgement (HARQ-ACK) feedback for a TB sent on the second time unit has been activated, and the HARQ-ACK feedback comprises an acknowledgement (ACK) or a negative acknowledgement (NACK); and the method further comprises:

in a case that the second terminal device has not received an ACK sent by the first terminal device and indicating a transmission success of the first TB, reselecting, by the second terminal device, reserved resources on the first time unit; or in a case that the second terminal device has received an NACK sent by the first terminal device and indicating a transmission failure of the first TB, reselecting, by the second terminal device, reserved resources on the first time unit.

16. The method of claim 15, wherein a format of a second stage SL control information (SCI) sent by the second terminal device on the second time unit is 2-A; a value of a cast type indicator field in the second stage SCI indicates that groupcast is performed when HARQ-ACK information comprises the ACK or the NACK, or the value of the cast type indicator field in the second stage SCI indicates that unicast is performed; and a value of an HARQ feedback enabled/disabled indicator field in the second stage SCI indicates that the HARQ-ACK feedback is to be activated and the ACK or the NACK is to be fed back.

17. The method of claim 13, wherein:

in response to the first terminal device being a target receiving terminal for the second terminal device, the second terminal device has sent a first TB to the first terminal device on a second time unit, the reserved resources are used for retransmission of the first TB, the second time unit is before the target time unit, HARQ-ACK feedback for a TB sent on the second time unit has been activated, and the HARQ-ACK feedback comprises only an NACK; and the method further comprises:

in a case that the second terminal device has received an NACK sent by the first terminal device and indicating a transmission failure of the first TB, reselecting, by the second terminal device, reserved resources on the first time unit.

18. The method of claim 17, wherein:

a format of a second stage SCI sent by the second terminal device on the second time unit is 2-A, a value of a cast type indicator field in the second stage SCI indicates that groupcast is performed when HARQ-ACK information comprises only the NACK, and a value of an HARQ feedback enabled/disabled indicator field in the second stage SCI indicates that the HARQ-ACK feedback is to be activated and only the NACK is able to be fed back; or the format of the second stage SCI sent by the second terminal device on the second time unit is 2-B, and the value of the HARQ feedback enabled/disabled indicator field in the second stage SCI indicates that the HARQ-ACK feedback is to be activated and only the NACK is able to be fed back.

19. The method of claim 13, wherein:

in response to the first terminal device being a target receiving terminal for the second terminal device, the second terminal device has sent a first TB to the first terminal device on a second time unit, the reserved resources are used for new transmission of a second TB, and the second time unit is before the target time unit; and the method further comprises:

reselecting, by the second terminal device, reserved resources on the first time unit.

20. A terminal device, comprising:

a memory configured to store computer programs; and a processor configured to invoke and execute the computer programs stored in the memory to:

determine presence of a resource conflict on resources reserved by a second terminal device on a first time unit; and determine whether to send a resource conflict indication to the second terminal device on a target time unit;

wherein the resource conflict indication indicates the presence of the resource conflict on the resources reserved by the second terminal device on the first time unit, the target time unit is a last time unit of at least one time unit before the first time unit, an interval between the target time unit and the first time unit is greater than or equal to a first threshold, the at least one time unit is used for transmission of sidelink (SL) feedback information, and the first threshold is associated with a sub-carrier interval of a SL carrier;

wherein in response to the first terminal device being not a target receiving terminal for the second terminal device, in terms of determining whether to send the resource conflict indication to the second terminal device on the target time unit, the processor is configured to invoke and execute the computer programs stored in the memory to:

determine according to a priority of a physical SL feedback channel (PSFCH) used for transmission of the resource conflict indication on the target time unit, whether to send the resource conflict indication to the second terminal device on the target time unit.

* * * * *